(12) United States Patent
Grimm et al.

(10) Patent No.: US 11,932,296 B2
(45) Date of Patent: Mar. 19, 2024

(54) METHOD FOR OBTAINING ROUTE AND DIRECTIVE DATA FOR INTERLOCKED SUBDIVISIONS

(71) Applicant: Westinghouse Air Brake Technologies Corporation, Wilmerding, PA (US)

(72) Inventors: Ann K. Grimm, Cedar Rapids, IA (US); Rebecca W. Dreasher, Longmont, CO (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 1238 days.

(21) Appl. No.: 16/443,485

(22) Filed: Jun. 17, 2019

(65) Prior Publication Data
US 2019/0389499 A1 Dec. 26, 2019

Related U.S. Application Data

(60) Provisional application No. 62/688,205, filed on Jun. 21, 2018.

(51) Int. Cl.
*B61L 27/16* (2022.01)
*B61L 25/02* (2006.01)
(Continued)

(52) U.S. Cl.
CPC .............. *B61L 27/16* (2022.01); *B61L 25/02* (2013.01); *B61L 27/30* (2022.01); *B61L 27/40* (2022.01);
(Continued)

(58) Field of Classification Search
CPC ....... H04L 43/103; H04L 43/10; H04L 67/12; B61L 25/02; B61L 25/025; B61L 27/16;
(Continued)

(56) References Cited

U.S. PATENT DOCUMENTS 7,832,691 B2 * 11/2010 Reibeling ............... B61L 29/32
246/126
8,224,510 B2 7/2012 Daum et al.
(Continued)

FOREIGN PATENT DOCUMENTS

WO 2006097788 A1 9/2006
WO 2016203298 A1 12/2016

OTHER PUBLICATIONS

Office Action dated Jun. 14, 2022 for corresponding application No. MX/a/2019/007340. English translation provided.
(Continued)

*Primary Examiner* — Angela Y Ortiz
*Assistant Examiner* — Aaron K McCullers
(74) *Attorney, Agent, or Firm* — Joseph M. Butscher; The Small Patent Law Group, LLC

(57) ABSTRACT

A system, method, and computer program product for determining ancillary subdivision/districts may include obtaining track data associated with one or more railroads operating one or more subdivisions/districts over which the train may travel, determining an ancillary subdivision/district of the one or more subdivisions/districts that are not included in the track data by any of the one or more railroads, receiving track data for the railroad associated with the ancillary subdivision/district, and communicating with one or more wayside interface units in the ancillary subdivision/district based on the track data.

21 Claims, 12 Drawing Sheets

(51) Int. Cl.
  *B61L 27/30* (2022.01)
  *B61L 27/40* (2022.01)
  *B61L 27/70* (2022.01)
  *G01C 21/00* (2006.01)
  *G06F 16/23* (2019.01)
  *H04L 43/103* (2022.01)
  *H04L 67/12* (2022.01)

(52) U.S. Cl.
  CPC ............ *B61L 27/70* (2022.01); *G01C 21/005* (2013.01); *G06F 16/2365* (2019.01); *H04L 43/103* (2013.01); *H04L 67/12* (2013.01)

(58) Field of Classification Search
  CPC .......... B61L 27/20; B61L 27/30; B61L 27/40; B61L 27/70; G01C 21/005
  USPC ........................................................... 701/19
  See application file for complete search history.

(56) References Cited

U.S. PATENT DOCUMENTS

| | | | | |
|---|---|---|---|---|
| 9,168,936 | B2 * | 10/2015 | Grimm | .................... B61L 27/20 |
| 9,616,905 | B2 | 4/2017 | Kernwein et al. | |
| 2004/0030466 | A1 * | 2/2004 | Rezk | .................... B61L 15/0045 701/19 |
| 2012/0323411 | A1 * | 12/2012 | Whitwam | ................ B61L 11/08 701/19 |
| 2013/0018534 | A1 * | 1/2013 | Hilleary | .................... B61L 29/30 701/19 |
| 2015/0217790 | A1 * | 8/2015 | Golden | ................. B60T 17/228 701/19 |
| 2016/0082988 | A1 * | 3/2016 | Kurz | .................... B61L 15/0027 701/19 |
| 2016/0086391 | A1 * | 3/2016 | Ricci | ...................... G06Q 30/06 701/29.3 |
| 2016/0152254 | A1 * | 6/2016 | Dreasher | ............. B61L 15/0027 701/19 |
| 2016/0355199 | A1 * | 12/2016 | Kernwein | ............ B61L 15/0027 |
| 2017/0217462 | A1 * | 8/2017 | West | ........................ B61L 27/40 |
| 2018/0150086 | A1 * | 5/2018 | Nobukawa | ............ G08G 1/0129 |

OTHER PUBLICATIONS

Print out of a Google search for "wayside interface unit" dated Nov. 14, 2022.
Examiner's Requisition received for related Canadian Patent Application No. 3,047,454 mailed Jan. 23, 2023 (5 bages).

* cited by examiner

METHOD FOR OBTAINING ROUTE AND DIRECTIVE DATA FOR INTERLOCKED SUBDIVISIONS

CROSS REFERENCE TO RELATED APPLICATION

This application claims the benefit of U.S. Provisional Application No. 62/688,205, filed Jun. 21, 2018, the entire disclosure of which is hereby incorporated by reference in its entirety.

BACKGROUND

Field of the Invention

Disclosed embodiments relate generally to vehicle control systems and networks, such as railroad systems, including vehicles travelling in a track network, and in particular to a method and system for providing more efficient retrieval of the data required by trains for identifying track networks and operating within interlocked subdivisions.

Description of Related Art

A railroad operating authority is responsible for conducting rail traffic along one or more subdivisions under its control. The movement of one or more trains along a route can be governed in a variety of ways. An operating authority of a railroad may operate in one or more of the vehicle systems and track networks that exist throughout the world, and at any point in time, may include many types of vehicles, such as, for example, cars, trucks, buses, trains, and/or the like that are travelling throughout the vehicle systems and track networks. With reference to trains travelling along a route, such trains may be equipped with, or operated by using vehicle control systems (e.g., communication based train control and management systems).

Vehicle control systems responsible for conducting safe rail traffic in the United States are regulated by the Federal Railroad Administration. For example, vehicle control systems, in addition to maintaining speed control, also provide track data for operating the train while traversing a route. In an example, during initialization, the train's crew selects the railroads over which the train may operate on a particular route. Alternatively, while traversing a route, a change may occur in subdivision/districts requiring an update. A back office of each operating railroad then provides a list of train IDs. The crew selects a train ID that applies to their train for an operating railroad, including one for each operating railroad. A back office system then provides a list of subdivision/districts based on the train ID's. After receiving the list of subdivision/districts, a train may obtain correct track data. To determine a correct version of the track data, the train communicates with the one or more railroads operating the one or more subdivisions/districts of the track network over which the train is expected to travel. The vehicle control system determines the correct version of track data by matching each subdivision/district with a received version, and any mandatory directives that apply are matched to a respective subdivision/district.

SUMMARY

In some non-limiting embodiments or aspects, provided are dynamic vehicle control systems, computer-implemented methods, and computer program products for more efficient retrieval of data required by trains for identifying track networks and operating within interlocked (e.g., intersecting, etc.) subdivisions/districts. Preferably, provided are improved systems, methods, and computer program products that overcome certain deficiencies and drawbacks associated with existing systems, methods, and computer program products for retrieving data required by trains for identifying track networks and operating within interlocked subdivisions/districts.

According to some non-limiting embodiments or aspects, provided is a computing system comprising: one or more processors programmed and/or configured to: obtain track data associated with one or more railroads operating one or more subdivisions/districts over which a train may travel; determine an ancillary subdivision/district of the one or more subdivisions/districts that is not included in the track data from any of the one or more railroads initialized with the onboard computer; receive the track data for the railroad associated with the ancillary subdivision/district; and communicate with one or more wayside interface units in the ancillary subdivision/district based on the track data.

According to some non-limiting embodiments or aspects, provided is a method, comprising: obtaining, by an onboard computer of a train, track data associated with one or more railroads operating one or more subdivisions over which the train may travel; determining, by the onboard computer, an ancillary subdivision/district of the one or more subdivisions that is not included in the track data by any of the one or more railroads; receiving, by the onboard computer, the track data for the railroad associated with the ancillary subdivision/district; and communicating with one or more wayside interface units in the ancillary subdivision/district based on the track data.

According to some non-limiting embodiments or aspects, provided is a computer program product including at least one non-transitory computer-readable medium including one or more instructions that, when executed by at least one processor, cause the at least one processor to obtain track data associated with one or more railroads operating one or more subdivisions over which a train may travel; determine an ancillary subdivision/district of the one or more subdivisions that is not included in the track data by any of the one or more railroads; receive the track data for the railroad associated with the ancillary subdivision/district; and communicate with one or more wayside interface units in the ancillary subdivision/district based on the track data.

Further non-limiting embodiments or aspects are set forth in the following numbered clauses:

Clause 1: A computer-implemented method, comprising: obtaining, by an onboard computer of a train, track data associated with one or more railroads operating one or more subdivisions over which the train may travel; determining, by the onboard computer, an ancillary subdivision of the one or more subdivisions that is not included in the track data by any of the one or more railroads; receiving, by the onboard computer, the track data for the railroad associated with the ancillary subdivision; and communicating with one or more wayside interface units in the ancillary subdivision based on the track data.

Clause 2: The method of clause 1, wherein determining the ancillary subdivision further comprises: determining at least one subdivision having at least one track segment intersecting the one or more subdivisions, wherein the at least one subdivision is not operated by the one or more railroads operating the one or more subdivisions, and further wherein the at least one subdivision comprises: the at least one track segment of the at least one subdivision, or the one or more wayside interface units of the at least one subdivision operating within the at least one track segment.

Clause 3: The method of any of clauses 1 and 2, comprising: registering a polling request for a back office computer of the railroad associated with the ancillary subdivision, the polling request including a train identifier; receiving a confirmation of poll registration from the back office computer; receiving poll messages including a hash over a list of mandatory directive identifiers and a track data version; and validating the track data.

Clause 4: The method of any of clauses 1-3, wherein the train identifier comprises a locomotive identifier, a train identifier established during initialization, or a train identifier assigned by the back office computer responding to the polling request.

Clause 5: The method of any of clauses 1-4, wherein the poll messages are received periodically, and wherein the poll messages comprise an identifier of at least one of a form-based authority, a bulletin, a speed restriction, or a null list of mandatory directive identifiers.

Clause 6: The method of any of clauses 1-5, comprising: deregistering if the ancillary subdivision is removed from a list of one or more subdivisions.

Clause 7: The method of any of clauses 1-6, comprising: resending the polling request for the track data within a threshold amount of time.

Clause 8. The method of clause 1-7, further comprising: generating, by the onboard computer, a request for the track data for the railroad associated with the ancillary subdivision; receiving a response including a track data version for the ancillary subdivision; validating the response; obtaining, by the onboard computer, the track data associated with the track data version; and updating the onboard computer with a portion of the track data associated with the ancillary subdivision.

Clause 9: The method of any of clauses 1-8, wherein obtaining the track data associated with the track data version comprises: determining if the track data is stored locally; in response to determining the track data is not stored locally, sending the request for the track data to a back office computer of the railroad associated with the ancillary subdivision; receiving the track data for the ancillary subdivision from the back office computer of the railroad associated with the ancillary subdivision; and validating the track data based on the request.

Clause 10: The method of any of clauses 1-9, comprising: receiving a local device status table to decode a device status code associated with a wayside device in the ancillary subdivision.

Clause 11: The method of any of clauses 1-10, comprising: storing, separately from the track data, a security key associated with the wayside interface unit in the ancillary subdivision; and obtaining the security key to decrypt a message received from the wayside interface unit based on a device status of a wayside device in the ancillary subdivision.

Clause 12: The method of any of clauses 1-11, wherein receiving the track data further comprises: updating the onboard computer with a portion of the track data for at least one railroad of the one or more railroads, wherein the track data includes intersecting subdivision identifiers associated with the track data of the at least one railroad having at least one track segment intersecting the one or more subdivisions.

Clause 13: The method of any of clauses 1-12, wherein the railroad associated with the ancillary subdivision determines a train identifier associated with the train is not in one or more train identifiers of the railroad associated with one or more respective trains, and wherein the railroad generates and sends the train identifier associated with the train, and further wherein the train registers a polling request for the ancillary subdivision based on the train identifier.

Clause 14: The method of any of clauses 1-13, wherein obtaining the track data further comprises: initializing the onboard computer by: providing information including employee credentials and the one or more railroads over which the train is expected to travel; and receiving, from a back office computer, at least one of a list of subdivisions the train is expected to operate over.

Clause 15: The computing system comprising: one or more processors programmed and/or configured to: obtain track data associated with one or more railroads operating one or more subdivisions over which a train may travel; determine an ancillary subdivision of the one or more subdivisions that is not included in the track data by any of the one or more railroads; receive the track data for the railroad associated with the ancillary subdivision; and communicate with one or more wayside interface units in the ancillary subdivision based on the track data.

Clause 16: The computing system of clause 15, wherein the one or more processors are further programmed and/or configured to determine the ancillary subdivision by: determining at least one subdivision having at least one track segment intersecting the one or more subdivisions, wherein the at least one subdivision is not operated by the one or more railroads operating the one or more subdivisions, and further wherein the at least one subdivision comprises: the at least one track segment of the at least one subdivision, or the one or more wayside interface units of the at least one subdivision operating within the at least one track segment.

Clause 17: The computing system of any of clauses 15 and 16, wherein the one or more processors are further programmed and/or configured to: register a polling request for a back office computer of the railroad associated with the ancillary subdivision, the polling request including a train identifier; receive a confirmation of poll registration from the back office computer; receive poll messages including a hash over a list of mandatory directive identifiers and a track data version; and validate the track data Clause 18: The computing system of any of clauses 15-17, wherein the train identifier comprises a locomotive identifier, a train identifier established during initialization, or a train identifier assigned by the back office computer responding to the polling request.

Clause 19: The computing system of any of clauses 15-18, wherein the poll messages are received periodically, and wherein the poll messages comprise an identifier of at least one of a form-based authority, a bulletin, a speed restriction, or a null list of mandatory directive identifiers.

Clause 20: The computing system of any of clauses 15-19, wherein the one or more processors are further programmed and/or configured to: deregister if the ancillary subdivision is removed from a list of one or more subdivisions.

Clause 21: The computing system of any of clauses 15-20, wherein the one or more processors are further programmed and/or configured to: resend the polling request for the track data within a threshold amount of time.

Clause 22: The computing system of any of clauses 15-21, wherein the one or more processors are further programmed and/or configured to: generate, by the onboard computer, a request for the track data for the railroad associated with the ancillary subdivision; receive a response including a track data version for the ancillary subdivision; validate the response; obtain, by the onboard computer, the track data associated with the track data version; and update the onboard computer with a portion of the track data associated with the ancillary subdivision.

Clause 23: The computing system of any of clauses 15-22, wherein the one or more processors are further programmed and/or configured to obtain the track data associated with the track data version by: determine if the track data is stored locally; in response to determining the track data is not stored locally, send the request for the track data to a back office computer of the railroad associated with the ancillary subdivision; receive the track data for the ancillary subdivision from the back office computer of the railroad associated with the ancillary subdivision; and validate the track data based on the request.

Clause 24: The computing system of any of clauses 15-23, wherein the one or more processors are further programmed and/or configured to: receive a local device status table to decode a device status code associated with a wayside device in the ancillary subdivision.

Clause 25: The computing system of any of clauses 15-24, wherein the one or more processors are further programmed and/or configured to: store, separately from the track data, a security key associated with the wayside interface unit in the ancillary subdivision; and decrypt a message received from the wayside interface unit based on a device status of a wayside device in the ancillary subdivision using the security key.

Clause 26: The computing system of any of clauses 15-25, wherein the one or more processors are further programmed and/or configured to receive the track data by: updating the onboard computer with a portion of the track data for at least one railroad of the one or more railroads, wherein the track data includes intersecting subdivision identifiers associated with the track data of the at least one railroad having at least one track segment intersecting the one or more subdivisions.

Clause 27: The computing system of any of clauses 15-26, wherein the railroad associated with the ancillary subdivision determines a train identifier associated with the train is not in one or more train identifiers of the railroad associated with one or more respective trains, and wherein the railroad generates and sends the train identifier associated with the train, and further wherein the train registers a polling request for the ancillary subdivision based on the train identifier.

Clause 28: The computing system of any of clauses 15-27, wherein the one or more processors are further programmed and/or configured to obtain the track data by: initialize the onboard computer by: providing information including employee credentials and the one or more railroads over which the train is expected to travel; and receiving, from a back office computer, at least one of a list of subdivisions the train is expected to operate over.

Clause 29: The computer program product comprising at least one non-transitory computer-readable medium including program instructions that, when executed by at least one processor, cause the at least one processor to: obtain track data associated with one or more railroads operating one or more subdivisions over which a train may travel; determine an ancillary subdivision of the one or more subdivisions that is not included in the track data by any of the one or more railroads; receive the track data for the railroad associated with the ancillary subdivision; and communicate with one or more wayside interface units in the ancillary subdivision based on the track data.

Clause 30: The computer program product of clause 29, wherein the one or more instructions further cause the at least one processor to determine the ancillary subdivision by: determining at least one subdivision having at least one track segment intersecting the one or more subdivisions, wherein the at least one subdivision is not operated by the one or more railroads operating the one or more subdivisions, and further wherein the at least one subdivision comprises: the at least one track segment of the at least one subdivision, or the one or more wayside interface units of the at least one subdivision operating within the at least one track segment.

Clause 31: The computer program product of any of clauses 29-30, wherein the one or more instructions further cause the at least one processor to: register a polling request for a back office computer of the railroad associated with the ancillary subdivision, the polling request including a train identifier; receive a confirmation of poll registration from the back office computer; receive poll messages including a hash over a list of mandatory directive identifiers and a track data version; and validate the track data.

Clause 32: The computer program product of any of clauses 29-31, wherein the train identifier comprises a locomotive identifier, a train identifier established during initialization, or a train identifier assigned by the back office computer responding to the polling request.

Clause 33: The computer program product of any of clauses 29-32, wherein the poll messages are received periodically, and wherein the poll messages comprise an identifier of at least one of a form-based authority, a bulletin, a speed restriction, or a null list of mandatory directive identifiers.

Clause 34: The computer program product of any of clauses 29-33, wherein the one or more instructions further cause the at least one processor to: deregister if the ancillary subdivision is removed from a list of one or more subdivisions.

Clause 35: The computer program product of any of clauses 29-34, wherein the one or more instructions further cause the at least one processor to: resend the polling request for the track data within a threshold amount of time.

Clause 36: The computer program product of any of clauses 29-35, wherein the one or more instructions further cause the at least one processor to: generate, by the onboard computer, a request for the track data for the railroad associated with the ancillary subdivision; receive a response including a track data version for the ancillary subdivision; validate the response; obtain, by the onboard computer, the track data associated with the track data version; and update the onboard computer with a portion of the track data associated with the ancillary subdivision.

Clause 37: The computer program product of any of clauses 29-36, wherein the one or more instructions further cause the at least one processor to obtain the track data associated with the track data version by: determining if the track data is stored locally; in response to determining the track data is not stored locally, sending the request for the track data to a back office computer of the railroad associated with the ancillary subdivision; receiving the track data for the ancillary subdivision from the back office computer of the railroad associated with the ancillary subdivision; and validating the track data based on the request.

Clause 38: The computer program product of any of clauses 29-37, wherein the one or more instructions further cause the at least one processor to: receive a local device status table to decode a device status code associated with a wayside device in the ancillary subdivision.

Clause 39: The computer program product of any of clauses 29-38, wherein the one or more instructions further cause the at least one processor to: store, separately from the track data, a security key associated with the wayside interface unit in the ancillary subdivision; and decrypt a message received from the wayside interface unit based on a device status of a wayside device in the ancillary subdivision using the security key.

Clause 40: The computer program product of any of clauses 29-39, wherein the one or more instructions further cause the at least one processor to receive the track data by: updating the onboard computer with a portion of the track data for at least one railroad of the one or more railroads, wherein the track data includes intersecting subdivision identifiers associated with the track data of the at least one railroad having at least one track segment intersecting the one or more subdivisions.

Clause 41: The computer program product of any of clauses 29-40, wherein a railroad of the one or more railroads associated with the ancillary subdivision determines a train identifier associated with the train is not in one or more train identifiers of the railroad associated with one or more respective trains, and wherein the railroad generates and sends the train identifier associated with the train, and further wherein the train registers a polling request for the ancillary subdivision based on the train identifier.

Clause 42: The computer program product of any of clauses 29-41, wherein the one or more instructions further cause the at least one processor to obtain the track data by: initialize the onboard computer by: providing information including employee credentials and the one or more railroads over which the train is expected to travel; and receiving, from a back office computer, at least one of a list of subdivisions the train is expected to operate over.

These and other features and characteristics of the present disclosure, as well as the methods of operation and functions of the related elements of structures and the combination of parts and economies of manufacture, may become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

DETAILED DESCRIPTION

Figure 1:
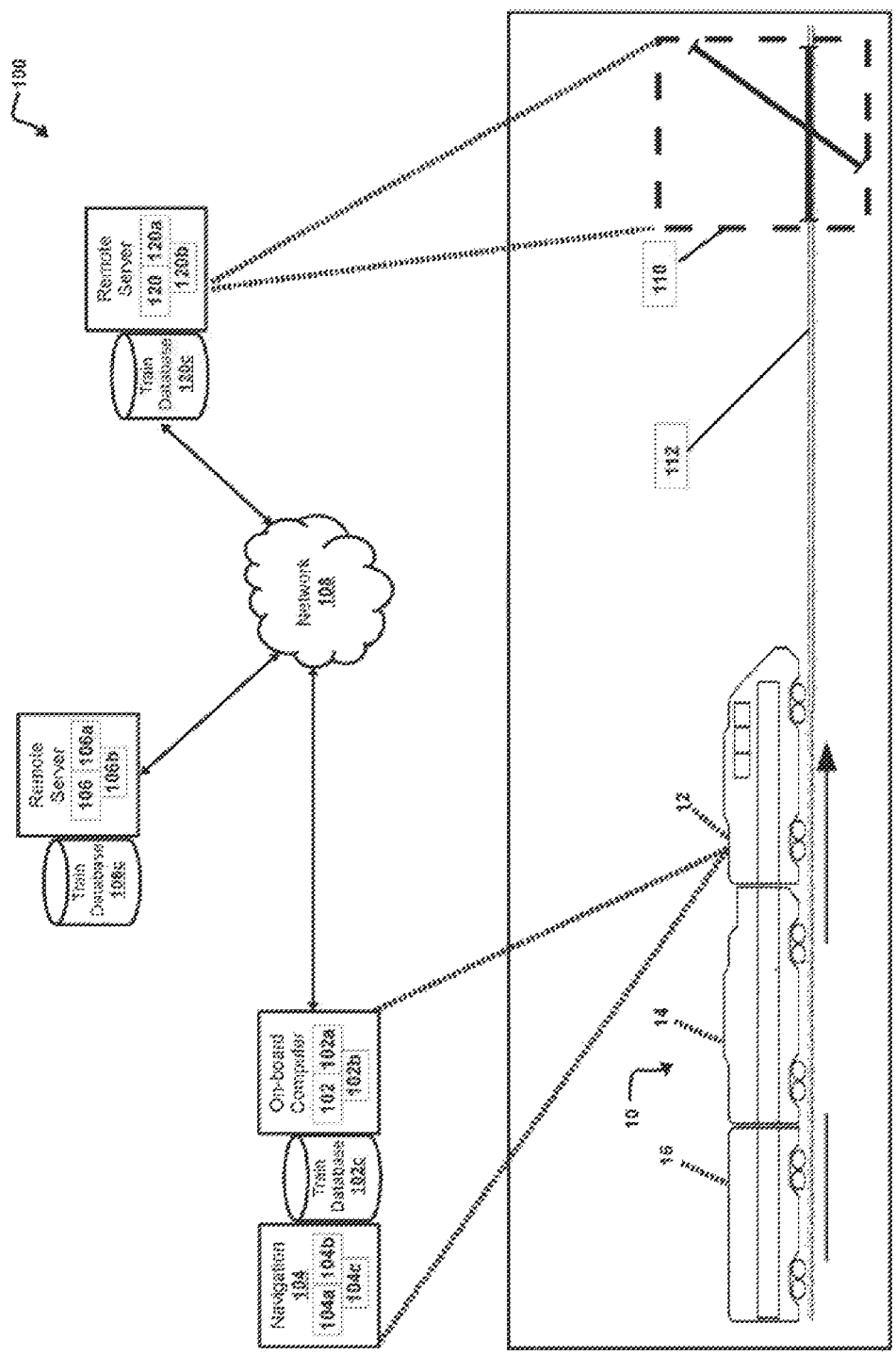
FIG. 1 is a diagram of a non-limiting embodiment or aspect of a vehicle control system 100 in which systems, devices, products, apparatuses, and/or methods, described herein, can be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

For purposes of the description hereinafter, the terms "end," "upper," "lower," "right," "left," "vertical," "horizontal," "top," "bottom," "lateral," "longitudinal," and derivatives thereof shall relate to embodiments or aspects as they are oriented in the drawing figures. However, it is to be understood that embodiments or aspects may assume various alternative variations and step sequences, except where expressly specified to the contrary. It is also to be understood that the specific devices and processes illustrated in the attached drawings, and described in the following specification, are simply non-limiting exemplary embodiments or aspects. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like, are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It may be appreciated that numerous other arrangements are possible.

As used herein, the term "vehicle control system" may refer to a vehicle control system comprised of digital data link communications networks, continuous and accurate positioning systems, such as GPS, onboard computers with digitized maps on locomotives and maintenance-of-way equipment, in-cab displays, throttle-brake interfaces on locomotives, wayside systems (e.g., wayside interface units at switches, wayside devices, etc.), and control center computers and displays. In some examples, vehicle control systems may also interface with tactical and strategic traffic planners, work order reporting systems, and locomotive health reporting systems.

In some non-limiting embodiments or aspects, vehicle control systems may issue mandatory directives (e.g., a movement authority, a speed restriction, etc.) to train and maintenance-of-way crews, track the location of the trains and maintenance-of-way vehicles, enforce movement authorities, and continually update operating data systems with information on the location of trains, locomotives, cars, and crews, and/or the like. As an example, vehicle control systems can be programmed to provide an automatically controlled stop by a remote computer (e.g., a central computer, back office system (BOS), etc.) for stopping a train should the locomotive crew be incapacitated. Vehicle control systems provide a railroad with data and/or obtain data to run scheduled operations and running time, control asset utilization, and administer track management, capacity, and/or the like.

As used herein, the term "ancillary" may refer to a division, subdivision, roadway, railroad, track segment, and/or the like over which a train may operate, but exists as a short piece of track interlocked within another subdivision/district, and may additionally contain a wayside system (e.g., wayside interface units, wayside devices, etc.) for controlling movement over the interlocked track (e.g., a WIU linked subdivision/district, etc.). The track data for the railroad associated with the ancillary subdivision/district may refer to a file, database, or other logical representation that includes track segment and wayside interface unit information needed by the onboard computer in order to traverse a train's route.

As used herein, the term "train subdivision/district list" may refer to any divisions, subdivisions, or districts over which the train may operate as compiled from the train subdivision/district messages received from the operating railroads that are selected at initialization.

As used herein, the term "ancillary subdivision/district list" may refer to the one or more ancillary subdivision/districts, subdivisions, or districts operated by a respective railroad which are needed by the onboard computer in order to traverse a route, and may include an identifier or link to each ancillary subdivision/district. The ancillary subdivision/district list and train subdivision/district list provide any subdivision(s) and/or district(s) over which the train may travel.

As used herein, the term "operator" may refer to an engineer, conductor, a railroad worker, or any employee of a railroad whose duties include operating a train, responding, communicating, or analyzing track data, inspection, construction, maintenance or repair of railroad track, bridges, roadways, signal and communication systems, electric traction systems, railroad facilities or railway maintenance machinery on, near, or with the potential of damaging (e.g., fouling) a track, and flagmen, safety crew, and watchmen/lookouts.

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUI) with which a user may interact, either directly or indirectly (e.g., through a keyboard, mouse, touchscreen, etc.). Further, multiple computers, e.g., servers, or other computerized devices, such as an autonomous vehicle including a vehicle computing system, directly or indirectly communicating in the network environment, may constitute a "system" or a "computing system".

It may be apparent that the systems and/or methods described herein can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

In existing systems, track data is obtained for any known subdivisions/districts, for example a correct track data version is obtained or provided by a railroad for any subdivision/district included in an upcoming route plan. However, existing systems may not provide and/or may not accurately provide train identifiers and/or track data for a subdivision/district that is unknown by the system and/or not in the route plan (e.g., an ancillary subdivision/district, etc.). For example, existing systems may not accurately obtain and provide track data for any geographic areas including a railroad and/or a segment of a railroad (e.g., a subdivision/district, etc.) where a train may cross over a small segment of track belonging to another railroad (e.g., an interlocked track, an intersecting track, etc.) and/or a track (e.g., segment of track, intersecting track, etc.) associated with a shortened traversal time for the train traveling across that railroad. Additionally and/or alternatively, existing systems may be unable to obtain and/or may not accurately and/or not sufficiently obtain subdivisions/districts associated with a railroad that has not been identified during initialization or updates, may not be able to identify and/or communicate with wayside systems located in and/or associated with a subdivision/district that has not been identified, and may not determine or may not sufficiently determine track data or mandatory directives for a subdivision/district that is not sufficiently identified and/or validated. Still further, existing systems may be unable to obtain mandatory directives or correct track data needed for activating wayside systems associated with the route plan that the train needs for traversing an ancillary subdivision/district.

As disclosed herein, in some non-limiting embodiments or aspects, a system, a device, or method of train control may include: obtaining, by an onboard computer of a train, track data (e.g., track data, etc.) associated with one or more railroads operating one or more subdivisions/districts over which the train may travel; determining, by the onboard computer, an ancillary subdivision/district of the one or more subdivisions/districts that is not included in the track data by any of the one or more railroads; receiving, by the onboard computer, track data for the railroad associated with the ancillary subdivision/district; and communicating with one or more wayside interface units in the ancillary subdivision/district based on the track data. In this way, systems, devices, or methods of train control may obtain accurate and sufficient track data for determining mandatory directives and/or track segments for any subdivision/district, such as, for example a subdivision/district that is previously unknown by the system (e.g., never before initialized), unrecorded in railroads identified by an operator, and/or may not be in the route plan (e.g., an ancillary subdivision/district, etc.). For example, the systems, devices, or methods of train control may obtain and/or provide track data for railroads in any geographic areas including a railroad and/or a segment of railroad where a train may cross over a small segment of track belonging to another railroad (e.g., an interlocked track, an intersecting track, etc.) and/or a track (e.g., segment of track, intersecting track, etc.) associated with shortened traversal times. Additionally and/or alternatively, systems, devices, or methods of train control may identify and obtain any subdivisions/districts associated with a railroad, including those that may not be identified during initialization or operator updates, identify or communicate with devices located in and/or associated with a subdivision/district that has not been previously identified, and may determine track data for an ancillary subdivision/district. In a further example, systems, devices, or methods of train control may obtain mandatory directives and correct track data for activating wayside devices associated with the route plan that the train needs for traversing an ancillary subdivision/district. Additionally, systems, devices, or methods of train control may accurately and/or efficiently provide enforcement of restrictive speeds and signal operations within an ancillary subdivision/district.

Referring now to FIG. 1, FIG. 1 is a diagram of a non-limiting embodiment or aspect of a vehicle control system 100 in which systems and/or methods, described herein, can be implemented. In some non-limiting embodiments or aspects of vehicle control system 100, train 10 includes a locomotive 12, one or more railcars 14, and an end of train railcar 16. Systems and/or devices of vehicle control system 100 can interconnect via wired connections, wireless connections, or a combination of wired and wireless connections.

In some non-limiting embodiments or aspects, vehicle control system 100 and methods described herein may be implemented on, or in connection with, an onboard computer 102 of at least one locomotive 12 in train 10, providing a communication device 102a, a display interface 102b, and a train database 102c. For example, onboard computer 102 of train 10 may obtain track data associated with one or more railroads operating one or more subdivisions/districts over which the train will travel. Onboard computer 102 may determine an ancillary subdivision/district that is not included in the track data for any of the one or more railroads included in the train subdivision/district list. In a further example, onboard computer 102 may request and/or receive track data for the railroad associated with the ancillary subdivision/district. Still further, onboard computer 102 may communicate with one or more wayside systems (e.g., a wayside interface unit, wayside device, etc.) in the ancillary subdivision/district based on the track data.

In some non-limiting embodiments or aspects, the onboard computer 102 may be located at any position or orientation on the train 10. In some non-limiting embodiments or aspects, the onboard computer 102 (e.g., onboard controller, onboard vehicle control system, train management computer, and/or the like) performs the calculations for dynamic train control in a railroad (e.g., a railway, a track network, etc.).

In some non-limiting embodiments or aspects, onboard computer 102 includes an onboard control system, such as an onboard control system that is associated with a vehicle control system 100 (e.g., a comprehensive train control system that encompasses one or more railroads, one or more subdivisions, one or more districts, one or more track networks, and/or the like). As an example, onboard computer 102 includes a communication device 102a (e.g., a data radio, etc.), which may be used to communicate between the onboard computer 102 in one or more of the locomotives 12 of a train 10, and a wayside system, (e.g., a wayside interface unit, wayside device, a switch monitor, etc.), a display unit 102b that may be provided in the locomotive 12 to visually display information or data to an operator, a track database 102c that may include track data (e.g., a client data store having a copy of track data having railroad and/or train information and data, including track information, switch information, signal information, track heading changes (e.g., curves, etc.), distance measurements (e.g., distance measurements between track positions or locations, etc.), train information (e.g., the number of locomotives 12, the number of railcars 14, the number of conventional passenger cars, the total length of the train 10, etc.), vehicle identifiers, train control equipment identifiers (e.g., an onboard computer 102), and/or the like, a remote server 106 (e.g., a back office server (BOS), a central controller, central dispatcher, etc.), that may include a communication device 106a (e.g., a data radio, etc.) and a display unit 106b that may be provided to visually display information or data.

In some non-limiting embodiments or aspects, onboard computer 102 may include a navigation system 104 (further including a positioning system 104a (e.g., a Global Positioning System (GPS), etc.), speed sensor 104b (e.g., a wheel tachometer, GPS, an odometer differentiated in time, etc.), an inertial sensor 104c (e.g., a rotational sensor, an accelerometer, a gyroscope, etc.) that is configured to measure the rate of the heading change for the locomotive 12, such as by a vehicle control system 100). In some non-limiting embodiments or aspects, at least a portion of the track data, may be received by, populated, or stored in at least one central database 106c (e.g., a remote database, etc.) accessible by or through the remote server 106. Accordingly, the track data is accessible throughout and useful within the railroad by any connected or communicative vehicle (e.g., a locomotive, consist, etc.) of any travelling train (or other vehicle) for navigational or other purposes. In some non-limiting embodiments or aspects, onboard computer 102 includes an onboard control system. The onboard computer 102 may perform onboard calculations of the vehicle control system 100 for the train 10, determine a location of objects in the railway, and operate on mandatory directives.

In some non-limiting embodiments or aspects, onboard computer 102 may determine a route (e.g., a path, a route, a trip, a traversal, etc.) of train 10 to include an ancillary subdivision/district 110. For example, as shown in FIG. 1, train 10 is traversing a subdivision/district 112 with a heading in the direction of an ancillary subdivision/district 110. In such an example, ancillary subdivision/district 110 includes at least a portion of track data not included on a subdivision/district list for train 10 (e.g., a subdivision/district not having a link in subdivision/district list of the track data file of train 10, etc.). As an example, train 10 may not obtain or receive (e.g., may have been unable to obtain, etc.) track data for the ancillary subdivision/district 110 (e.g., a track data file, a track data version, etc.) during an initialization (e.g., vehicle control system initialization, update, etc.) of track data, such as track data associated with the track segments and wayside systems (e.g., wayside interface units and/or wayside devices) contained in the ancillary subdivision/district 110. In an example, onboard computer 102 may determine to obtain and/or load track data associated with the portion of a route contained in an ancillary subdivision/district (e.g., onboard computer 102 moves a copy of the track data file from a mobile device manager (persistent storage, non-volatile storage, etc.) into active memory (e.g., volatile storage, etc.)) based on a train ID established during initialization. In another example, onboard computer 102 may request a train ID from remote server 120 of a railroad associated with the ancillary subdivision/district 110. Remote server 120 may include a communication device 120a (e.g., a data radio, etc.) and a display unit 120b that may be provided to visually display information or data. Train 10 may not be capable of operating when crossing track segments or devices of the ancillary subdivision/district 110 without the track data for ancillary subdivision/district 110. Onboard computer 102 may register for polling the track data for the ancillary subdivision/district 110 based on the train ID from remote server 120. In such an example, onboard computer 102 of train 10 may register for polling with a railroad that is previously unknown to obtain track data for traversing ancillary subdivision/district 110. For example, ancillary subdivision/district 110 may be associated with a second railroad that operates remote server 120. Remote server 120 may be configured to store, obtain, and/or provide track data regarding the ancillary subdivision/district 110 in central database 120c and/or may communicate with and/or send track data to remote server 106 for traversing ancillary subdivision/district 110.

In some non-limiting embodiments or aspects, communication network 108 includes one or more wired and/or wireless networks. For example, communication network 108 includes a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks, such as electronic communication protocols and/or algorithms may be used including, for example, TCP/IP (including HTTP and other protocols), WLAN (including 802.11 and other radio frequency-based protocols and methods), analog transmissions, Global System for Mobile Communications (GSM), private wireless, public wireless, 160/220/900 MHz VHF, WiFi, UHF 452-458 MHz, WiMAX, omni-directional, and/or the like.

Figure 2B:
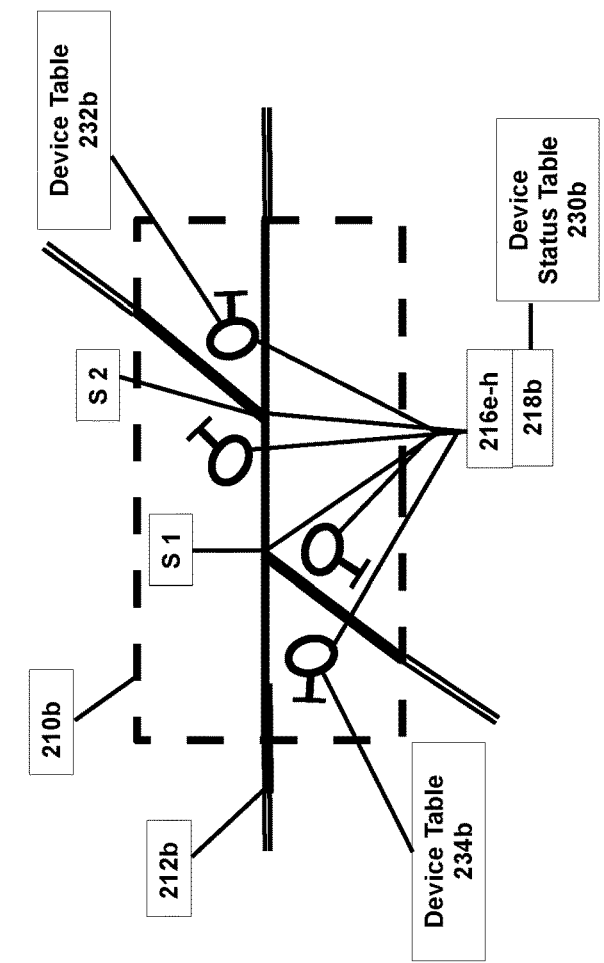
FIGS. 2A and 2B are diagrams of exemplary ancillary subdivision/districts of an implementation of one or more processes as disclosed herein.
Figure 2A:
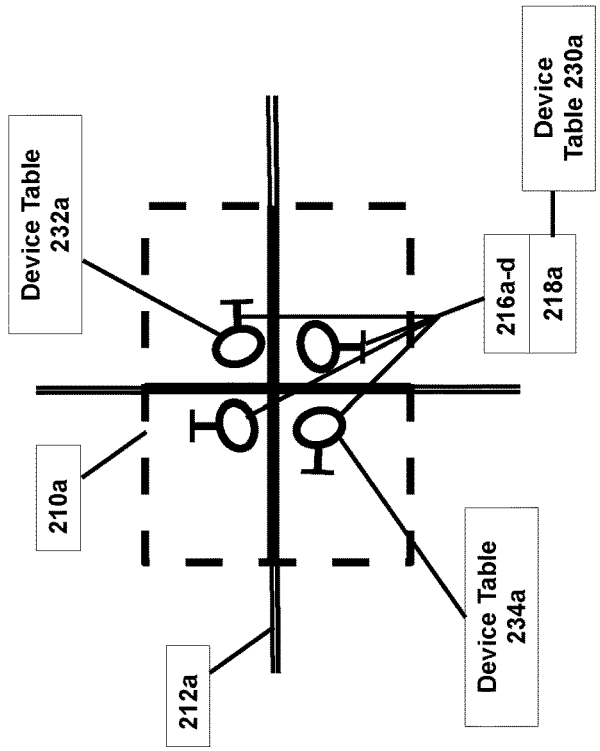

Referring now to FIGS. 2A and 2B, FIGS. 2A and 2B shows examples, in some non-limiting embodiments or aspects, for identifying an ancillary subdivision/district in which systems and/or methods, described herein, can be implemented. In some examples, subdivisions/districts 212a and 212b, as well as ancillary subdivisions/districts 210a and 210b of FIGS. 2A and 2B may correspond to subdivision/district 112 and ancillary subdivision/district 110 of FIG. 1. At least two characteristics may cause a subdivision/district to be ancillary to another subdivision/district. For example, an ancillary subdivision/district includes a short piece of track embedded within another subdivision/district. In another example, an ancillary subdivision/district may additionally include wayside devices that control movement over that embedded track. These characteristics are illustrated in FIGS. 2A and 2B.

As shown in FIG. 2A, FIG. 2A includes subdivision/district 212a and ancillary subdivision/district 210a, including the interlocked track segments, wayside devices 216a-d, and wayside interface unit 218a. As shown in FIG. 2B, FIG. 2B includes subdivision/district 212b and ancillary subdivision/district 210b, including the interlocked track segments, wayside devices 216e-h, and wayside interface unit 218b, and switches S1 and S2. In both FIG. 2A and FIG. 2B, a train 10 travelling on a track of a first subdivision/district 212a, 212b needs information about a second, ancillary subdivision/district 210a, 210b in order to pass over the interlocked track. In another non-limiting embodiment or aspect, a train 10 travelling on the second ancillary subdivision/district 210a, 210b can traverse the interlocked track without any information about the first subdivision/district. The first subdivision/district 212a, 212b, as shown in both figures is not ancillary to the second subdivision/district 210a, 210b.

In some non-limiting embodiments or aspects, a vehicle control system 100 (e.g., one or more data models running on remote server 106, onboard computer 102, remote server 120, etc.) may include a data storage for ancillary subdivision/district characteristics, for example a subdivision/district file format may identify any subdivision/district determined as being ancillary to the subdivision/districts for which the track data is being created (e.g., in an ancillary subdivision/district table, etc.). As an example, this information provides identification of the ancillary subdivision/districts. A data model may isolate the information for increasing processing speed for identifying an ancillary subdivision/district, such as, in a separate table, or in volatile memory. In another example, a vehicle control system 100 may include a data model for parsing the track data for linkages to other subdivision/districts.

In some non-limiting embodiments or aspects, onboard computer 102 retrieves track segment information from the track data for an ancillary subdivision/district when the track segment is embedded within a subdivision/district in the train subdivision/district list. For example, an entry in the ancillary subdivision/district table is needed for each instance where the track of an ancillary subdivision/district is interlocked within (e.g., intersecting, embedded, etc.) a subdivision/district in the train subdivision/district list.

In some non-limiting embodiments or aspects, an onboard computer 102 retrieves information on wayside devices that control movement over one or more interlocked track segment(s). For example, in some non-limiting embodiments or aspects, as shown in FIG. 2A, a device table 230a is associated with wayside interface unit 218a, device table 232a is associated with one or more of wayside devices 216a-d, and a device table 234a is associated with one or more of wayside devices 216a-d. In addition, as shown in FIG. 2B, a device table 230b is associated with wayside interface unit 218b, device table 232b is associated with a wayside device of wayside devices 216e-h, and a device table 234b is associated with a wayside device of wayside devices 216e-h. For example, one or more wayside devices and any wayside interface units that monitor them are defined in the same track data as the track segment(s) over which they control movement.

In some non-limiting embodiments or aspects, onboard computer 102 stores, determines, and/or communicates a status identifier from a plurality of status identifiers in a device table of an ancillary subdivision to provide a common enforcement group for both intersecting railroads of an interlocking roadway. In such an example, a signal group for translating (e.g., mapping, decoding, etc.) a status of a signal, may include indicators of train control actions for signals (or combinations of signals) such as, stop required, restricted speed, stop and proceed, stop at next signal, stop in two signals, clear to approach signal, and/or the like. For example, onboard computer 102 may determine a signal status while traversing a route for a wayside device 216a-d (or 216e-h) associated with wayside unit 218a based on a device table 230a (or 230b) associated with wayside interface unit 218a (or 230b) in track data for the ancillary subdivision 210a (or 210b).

In some non-limiting embodiments or aspects, onboard computer 102 stores, determines, and/or communicates a status identifier from a plurality of status identifiers in a device table 232a (or 232b, 234a, or 234b) of an ancillary subdivision from a first railroad of an ancillary subdivision/district that may not be mapped to the same enforcement group by the second railroad intersecting the ancillary subdivision. For example, a first mapping for a signal group may be included in device table 230a (or 230b) of the wayside interface unit 218a (or 218b) and a second mapping for enforcing the signal group differently than a first signal group may be included in a device table 232a (or 232b, 234a, or 234b). In such an example, onboard computer 102 receives device table 232a in track data of ancillary subdivision and retrieves a device status identifier from one or more device status identifiers stored in device table 232a associated with a wayside device 216a, mapped to a status identifier (e.g., status table ID, etc.). Onboard computer 102 may retrieve or reference the device status table to translate (e.g., decode, map, etc.) a signal device status identifier (e.g., a signal's specific or unique code for a status device, etc.) differently than a first mapping for a signal group in device table 230a (or 230b) of the wayside interface unit 218a (or 218b).

Figure 3:
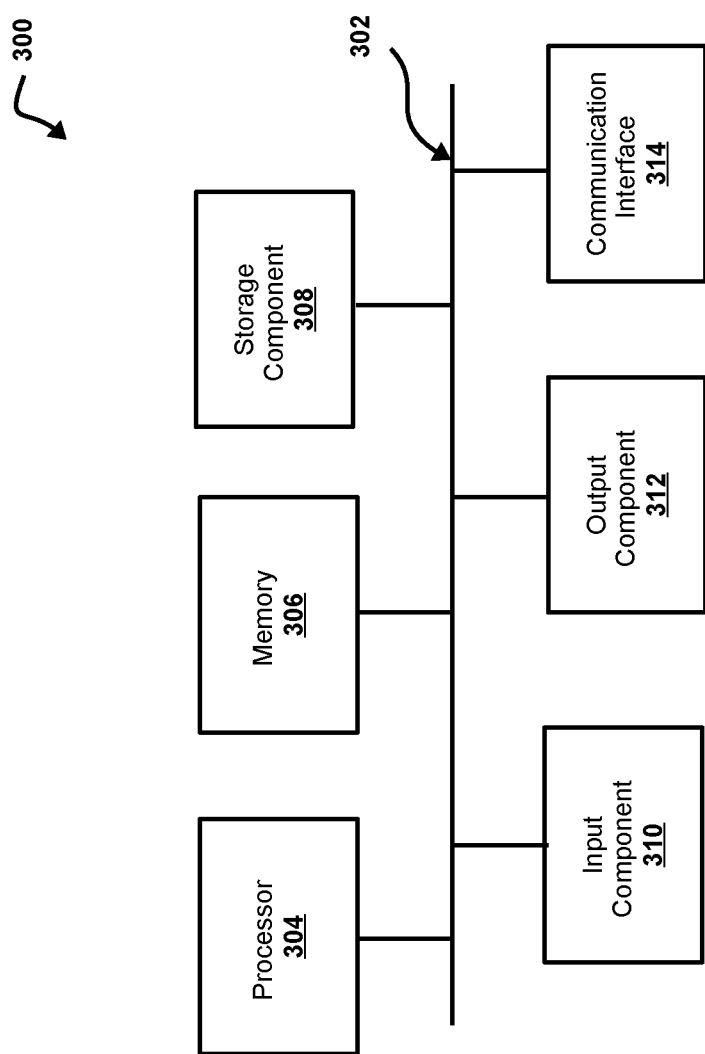
FIG. 3 is a diagram of a non-limiting embodiment or aspect of components of one or more devices and/or one or more systems of FIG. 1.

Referring now to FIG. 3, FIG. 3 is a diagram of example components of a device 300. Device 300 can correspond to one or more devices of onboard computer 102 and/or one or more devices of (e.g., one or more devices of a system of) train 10. In some non-limiting embodiments or aspects, one or more devices of vehicle control system 100, onboard computer 102, one or more devices of remote server 104 (e.g., one or more devices of an onboard vehicle control system of remote server 104, etc.), and/or one or more devices of remote server 120 (e.g., one or more devices of an onboard vehicle control system of remote server 120, etc.) can include at least one device 300 and/or at least one component of device 300. As shown in FIG. 3, device 300 includes bus 302, processor 304, memory 306, storage component 308, input component 310, output component 312, and communication interface 314 for some non-limiting embodiments or aspects of obtaining track data and mandatory directives by identifying ancillary subdivision/districts with the onboard computer 102.

Bus 302 includes a component that permits communication among the components of device 300. In some non-limiting embodiments or aspects, processor 304 is implemented in hardware, firmware, or a combination of hardware and software. For example, processor 304 includes a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 includes a random access memory (RAM), a read only memory (ROM), and/or another type of dynamic or static storage device (e.g., flash memory, magnetic memory, optical memory, etc.) that stores information and/or instructions for use by processor 304.

Storage component 308 stores information and/or software related to the operation and use of device 300. For example, storage component 308 includes a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 310 includes a component that permits device 300 to receive information, such as via user input (e.g., a touch screen display, a keyboard, a keypad, a mouse, a button, a switch, a microphone, etc.). Additionally, or alternatively, input component 310 includes a sensor for sensing information (e.g., a global positioning system (GPS) component, an accelerometer, a gyroscope, an actuator, etc.). Output component 312 includes a component that provides output information from device 300 (e.g., a display, a speaker, one or more light-emitting diodes (LEDs), etc.).

Communication interface 314 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 314 can permit device 300 to receive information from another device and/or provide information to another device. For example, communication interface 314 includes an Ethernet interface, an optical interface, a coaxial interface, an infrared interface, a radiofrequency (RF) interface, a universal serial bus (USB) interface, a Wi-Fi interface, a cellular network interface, and/or the like.

Device 300 can perform one or more processes described herein. Device 300 can perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A memory device includes memory space located inside of a single physical storage device or memory space spread across multiple physical storage devices.

Software instructions can be read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry can be used in place of or in combination with software instructions to perform one or more processes described herein. Thus, embodiments described herein are not limited to any specific combination of hardware circuitry and software.

Memory 306 and/or storage component 308 may include data storage or one or more data structures (e.g., a database, etc.). Device 300 may be capable of receiving information from, storing information in, communicating information to, or searching information stored in the data storage or one or more data structures in memory 306 and/or storage component 308. In some non-limiting embodiments or aspects, the information may include data (e.g., track data, sensor data, etc.) associated with one or more traversals of a railway by one or more vehicles.

The number and arrangement of components shown in FIG. 3 are provided as an example. In some non-limiting embodiments or aspects, device 300 includes additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
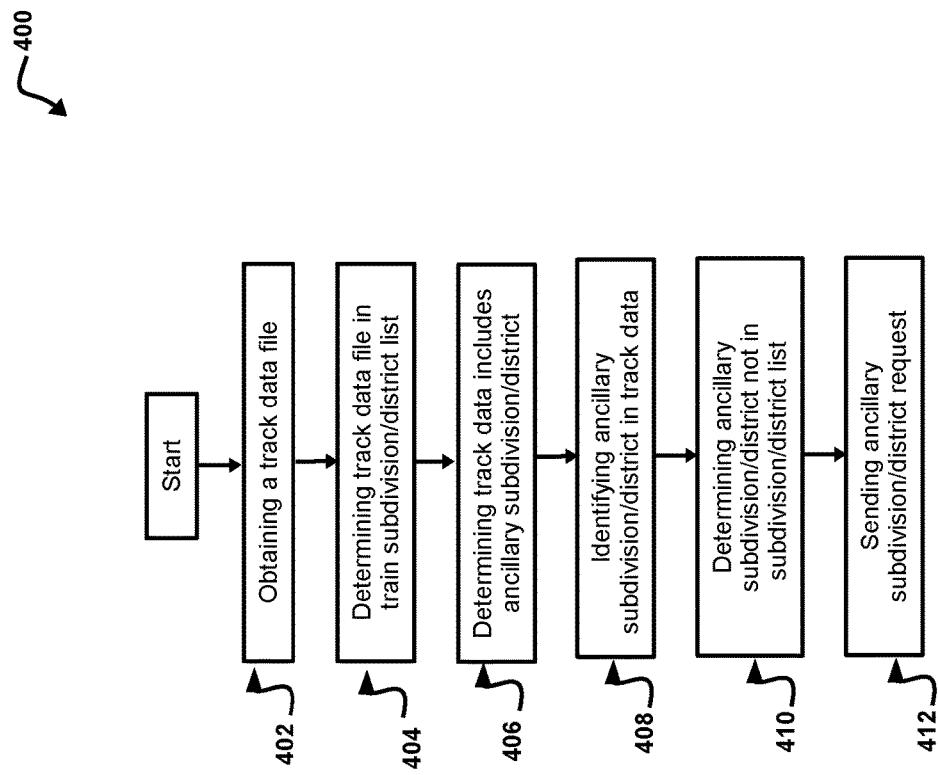
FIG. 4 is a flowchart of a non-limiting embodiment or aspect of a process for obtaining track data for interlocked subdivisions.

Referring now to FIG. 4, FIG. 4 is a flowchart of a non-limiting embodiment or aspect of a process 400 for identifying and requesting track data for ancillary subdivisions/districts. In some non-limiting embodiments or aspects, one or more of the steps of process 400 are performed (e.g., completely, partially, etc.) by onboard computer 102, navigation system 104, and/or remote server 106. In some non-limiting embodiments or aspects, one or more of the steps of process 400 are performed (e.g., completely, partially, etc.) by another device or a group of devices separate from or including onboard computer 102 (e.g., one or more processors of onboard computer 102, one or more processors of communication device 102a, one or more processors of visual display device 102b, one or more processors of train database 102c, etc.), remote server 106 (e.g., one or more processors of remote server 106, one or more processors of communication device 106a, one or more processors of visual display device 106b, one or more processors of central database 106c, etc.), navigation system 104 (e.g., one or more processors of navigation system 104, one or more processors of positioning system 104a, one or more speed sensors 104b, one or more inertial sensors 104c, etc.), remote server 120 (e.g., one or more processors of remote server 120, one or more processors of communication device 120a, one or more processors of visual display device 120b, one or more processors of central database 120c, etc.) and/or wayside interface unit 218a (e.g., one or more processors of wayside interface unit 218a, one or more processors of wayside devices 216a-d, 216e-h, etc.).

As shown in FIG. 4, at step 402, process 400 includes obtaining a track data file. For example, in some non-limiting embodiments or aspects, the onboard computer 102 receives or obtains track data (e.g., track data, track data file, etc.). As an example, a process starts when an onboard computer 102 obtains and/or loads track data, for example, following receipt of a train subdivision/district list message during initialization, while the train 10 is traversing a route, or if a current dataset list message is received in the polling process that indicates that the track data version has changed.

As shown in FIG. 4, at step 404, process 400 includes determining track data in a train subdivision/district list. For example, in some non-limiting embodiments or aspects, the onboard computer 102 determines track data in a train subdivision/district list (e.g., one or more subdivisions, one or more districts, any combination thereof, etc.). As an example, onboard computer 102 may determine if the newly-loaded track data is for a subdivision/district in the train subdivision/district list.

As shown in FIG. 4, at step 406, process 400 includes determining the track data includes an ancillary subdivision/district. For example, in some non-limiting embodiments or aspects, the onboard computer 102 determines that the track data includes an ancillary subdivision/district. For example, if the newly-loaded track data is for a subdivision/district in the train subdivision/district list, the onboard computer 102 checks the track data for ancillary subdivision/districts that need to be loaded. If that track data is not for a subdivision/district in the train subdivision/district list, the onboard computer 102 does not check the file for ancillary subdivision/districts, thus preventing recursive loading of track data.

As shown in FIG. 4, at step 408, process 400 includes identifying an ancillary subdivision/district in the track data. For example, in some non-limiting embodiments or aspects, the onboard computer 102 identifies ancillary subdivision/district in track data. For example, for any ancillary subdivision/district referenced by the track data, the onboard computer 102 checks whether the referenced subdivision/district is also in the train subdivision/district list. If so, the onboard computer 102 may obtain that track data.

As shown in FIG. 4, at step 410, process 400 includes determining an ancillary subdivision/district that is not in a known subdivision/district. For example, in some non-limiting embodiments or aspects, the onboard computer 102 determines an ancillary subdivision/district which is not within a subdivision/district on the subdivision/district list.

As shown in FIG. 4, at step 412, process 400 includes sending an ancillary subdivision/district version request. For example, in some non-limiting embodiments or aspects, the onboard computer 102 sends an ancillary subdivision/district version request including a railroad standard carrier alpha code ("SCAC") (e.g., a railroad SCAC of a railroad that operates the ancillary subdivision/district, etc.), an interface version (e.g., identifies a specific collection of message versions, etc.), and a subdivision/district ID (e.g., a subdivision identifier in a vehicle control system for an ancillary subdivision/district, etc.). For example, for any ancillary subdivision/district not included in the track data, the onboard computer 102 sends an ancillary subdivision/district version request message to a back office system (e.g., remote server 120, etc.) at the railroad that operates the ancillary subdivision/district. In some non-limiting embodiments or aspects, an ancillary subdivision/district request message may be directed to either a crew interaction back office system or a back office system (e.g., remote server 120, etc.) associated with a railroad's polygon. The onboard computer 102 may not have a track location on a subdivision/district operated by the operating railroad of the ancillary subdivision/district. In some examples, a back office system (e.g., remote server 120, etc.) may have the required information about which track data version the onboard computer 102 should use even if that back office system (e.g., remote server 120, etc.) does not control the ancillary subdivision/district.

Figure 5:
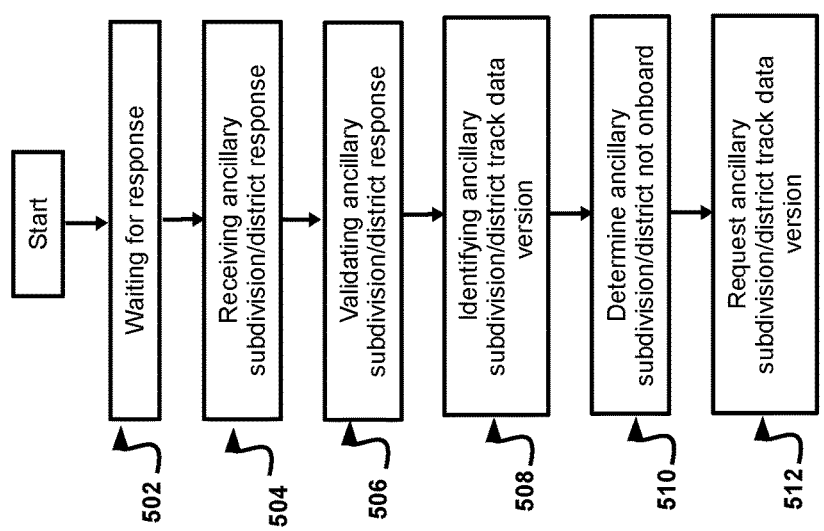
FIG. 5 is a flowchart of a non-limiting embodiment or aspect of a process for obtaining track data for interlocked subdivisions.

Referring now to FIG. 5, FIG. 5 is a flowchart of a non-limiting embodiment or aspect of a process 500 for responding to a request for track data for ancillary subdivision/districts. In some non-limiting embodiments or aspects, one or more of the steps of process 500 are performed (e.g., completely, partially, etc.) by vehicle control system 100, onboard computer 102, navigation system 104, and/or remote server 106. In some non-limiting embodiments or aspects, one or more of the steps of process 500 are performed (e.g., completely, partially, etc.) by another device or a group of devices separate from or including onboard computer 102 (e.g., one or more processors of onboard computer 102, one or more processors of communication device 102a, one or more processors of visual display device 102b, one or more processors of train database 102c, etc.), remote server 106 (e.g., one or more processors of remote server 106, one or more processors of communication device 106a, one or more processors of visual display device 106b, one or more processors of central database 120c, etc.), the navigation system 104 (e.g., one or more processors of navigation system 104, one or more processors of positioning system 104a, one or more speed sensors 104b, one or more inertial sensors 104c, etc.), remote server 120 (e.g., one or more processors of remote server 120, one or more processors of communication device 120a, one or more processors of visual display device 120b, one or more processors of central database 120c, etc.) and/or wayside interface unit 218a, 218b (e.g., one or more processors of wayside interface unit 218a, 218b, one or more processors of wayside devices 216a-d, etc.).

As shown in FIG. 5, at step 502, process 500 includes waiting for a response. For example, in some non-limiting embodiments or aspects, the onboard computer 102 waits for a response to an ancillary subdivision/district version request. As an example, the onboard computer 102 waits until a response to an ancillary subdivision/district version request is received, such as an onboard message including an ancillary subdivision/district response. In some non-limiting embodiments or aspects, one or more events may occur while the onboard computer 102 is waiting for a response to its ancillary subdivision/district version request message, such as, for example, a predetermined time may elapse, track data may be discarded from an onboard computer 102, an ancillary subdivision/district may be added to a train's list of the one or more subdivision/districts, an onboard computer 102 cuts out or fails to re-initialize, and/or the like. As an example, after a predetermined number of seconds elapse, onboard computer 102 may resend an ancillary subdivision/district version request message since it has not received a valid ancillary subdivision/district version message in response to a first request. In some examples, no limit is made on the number of retries as long as the track data file for a subdivision/district within the train's subdivision/district list includes a reference to this subdivision/district in its list of ancillary subdivision/district(s).

Whenever the onboard computer 102 discards a track data file, the onboard computer 102 may evaluate the subdivision/districts for which it is trying to obtain track data version information or a track data file to determine whether any of those subdivision/districts are no longer ancillary. If the onboard computer 102 determines that a subdivision/district is no longer ancillary, it may cease trying to obtain version information for the track data file or the track data file itself for that subdivision/district.

In some non-limiting embodiments or aspects, if an ancillary subdivision/district is added to the train subdivision/district list, the onboard computer 102 may stop sending ancillary subdivision/district request messages for that subdivision/district and instead obtain the track data file as specified in the existing design for subdivisions/districts in the train subdivision/district list. An example where this may occur is where the onboard computer 102 starts to gather track data based on a train subdivision/district list message from one operating railroad and then receives another train subdivision/district list message from a second operating railroad that happens to include the ancillary subdivision/district. If the onboard computer 102 state becomes non-controlling, the onboard computer 102 may stop trying to obtain the version of all ancillary subdivision/districts. The process of downloading track data from a server (e.g., a mobile device management server, etc.) may continue but the onboard computer 102 may not load any track data file obtained from the server into active memory.

As shown in FIG. 5, at step 504, process 500 includes receiving an ancillary subdivision/district response. For example, in some non-limiting embodiments or aspects, the onboard computer 102 receives an ancillary subdivision/district version response. For example, onboard computer 102 receives an ancillary subdivision/district version message in response to a an ancillary subdivision/district version request message including a railroad standard carrier alpha code ("SCAC") (e.g., a railroad SCAC of a railroad that operates the ancillary subdivision/district, etc.), a subdivision/district ID (e.g., a subdivision/district identifier in a vehicle control system for an ancillary subdivision/district, etc.), track data version, a CRC hash of a track data version, a reason for sending, and/or the like.

As shown in FIG. 5, at step 506, process 500 includes validating an ancillary subdivision/district response. For example, in some non-limiting embodiments or aspects, the onboard computer 102 validates an ancillary subdivision/district response. For example, onboard computer 102 may validate an ancillary subdivision/district version message it receives by performing validation checks such as, determining that a railroad SCAC and subdivision/district ID match those requested in the ancillary subdivision/district version request message or performing any other validation checks of a back office system message in accordance with the vehicle control system requirements.

In some non-limiting embodiments or aspects, if an ancillary subdivision/district version message is invalid, an onboard computer 102 may discard it and continue to wait for a valid message. In a further example, onboard computer 102 may determine, in response to determining an ancillary subdivision/district version message is valid and indicates that a subdivision/district identifier is unrecognized, to stop sending request ancillary subdivision/district version messages for that subdivision/district. This may happen if the interlocked railroads have not coordinated their track data generation or maintenance.

As shown in FIG. 5, at step 508, process 500 includes identifying an ancillary subdivision/district track data version. For example, in some non-limiting embodiments or aspects, the onboard computer 102 identifies an ancillary subdivision/district track data version. As an example, if an ancillary subdivision/district version message is valid and includes the track data file version information for the ancillary subdivision/district, the onboard computer 102 may check whether it has that version of track data in a data store. Based on determining onboard computer 102 includes correct track data, it may load that file into memory.

As shown in FIG. 5, at step 510, process 500 includes determining an ancillary subdivision/district not included onboard. For example, in some non-limiting embodiments or aspects, the onboard computer 102 determines an ancillary subdivision/district that is not in an onboard computer 102. For example, onboard computer 102 may attempt to obtain the track data from a server (e.g., a mobile device manager ("MDM"), etc.) of an operating railroad of the ancillary subdivision/district if it is not included in at least one of the onboard computer, the remote server, the remote database, the track database, and/or the like.

As shown in FIG. 5, at step 512, process 500 includes requesting an ancillary subdivision/district track data version. For example, in some non-limiting embodiments or aspects, the onboard computer 102 requests the ancillary subdivision/district track data version determined not onboard. As an example, onboard computer 102 sends a request for the track data to a remote server 120 of an operating railroad associated with the ancillary subdivision/district. If the onboard computer 102 is successful in obtaining the correct version of the track data for the ancillary subdivision/district, it may load the file into memory.

Figure 6A:
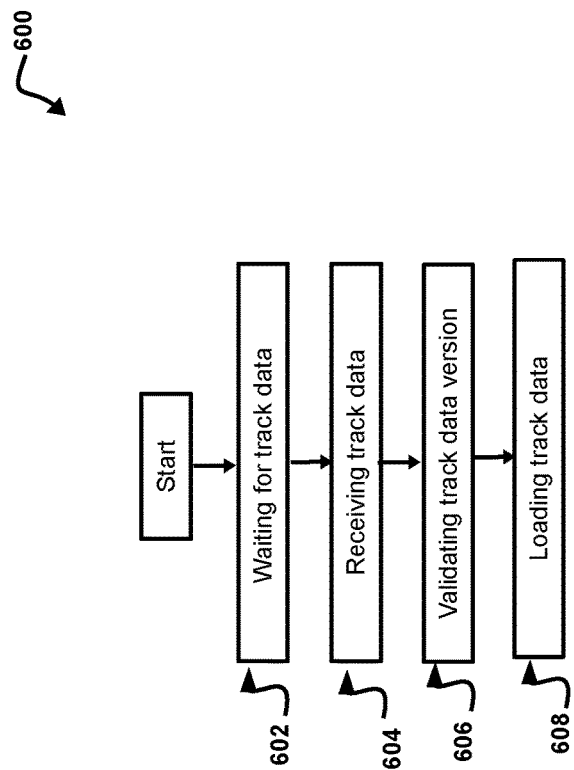
FIG. 6A is a flowchart of a non-limiting embodiment or aspect of a process for obtaining track data for interlocked subdivisions.

Referring now to FIG. 6, FIG. 6 is a flowchart of a non-limiting embodiment or aspect of a process 600 for responding to a request for track data for ancillary subdivision/districts. In some non-limiting embodiments or aspects, one or more of the steps of process 600 are performed (e.g., completely, partially, etc.) by onboard computer 102, navigation system 104, and/or remote server 106. In some non-limiting embodiments or aspects, one or more of the steps of process 600 are performed (e.g., completely, partially, etc.) by another device or a group of devices separate from or including onboard computer 102 (e.g., one or more processors of onboard computer 102, one or more processors of communication device 102a, one or more processors of visual display device 102b, one or more processors of train database 102c, etc.), remote server 106 (e.g., one or more processors of remote server 106, one or more processors of communication device 106a, one or more processors of visual display device 106b, one or more processors of central database 106c, etc.), the navigation system 104 (e.g., one or more processors of navigation system 104, one or more processors of positioning system 104a, one or more speed sensors 104b, one or more inertial sensors 104c, etc.), remote server 120 (e.g., one or more processors of remote server 120, one or more processors of communication device 120a, one or more processors of visual display device 120b, one or more processors of central database 120c, etc.) and/or wayside interface unit 218a, 218b (e.g., one or more processors of wayside interface unit 218a, 218b, one or more processors of wayside devices 216a-d, 216e-h, etc.).

As shown in FIG. 6, at step 602, process 600 includes waiting for track data. In some non-limiting embodiments or aspects, the onboard computer 102 waits for track data. As an example, the onboard computer 102 waits for track data to download.

As shown in FIG. 6, at step 604, process 600 includes receiving track data. For example, in some non-limiting embodiments or aspects, the onboard computer 102 receives track data (e.g., a track data file, etc.).

As shown in FIG. 6, at step 606, process 600 includes validating track data. For example, in some non-limiting embodiments or aspects, the onboard computer 102 validates track data.

As shown in FIG. 6, at step 608, process 600 includes loading track data. For example, in some non-limiting embodiments or aspects, the onboard computer 102 loads correct track data version. Once the onboard computer 102 has obtained the track data file for an ancillary subdivision/district it may have the edge message protocol ("EMP") address for the controlling the back office system (e.g., remote server 120, etc.) with which to register for polling. However, the identifier to use as its train ID depends on the railroad operating the ancillary subdivision/district.

Figure 6B:
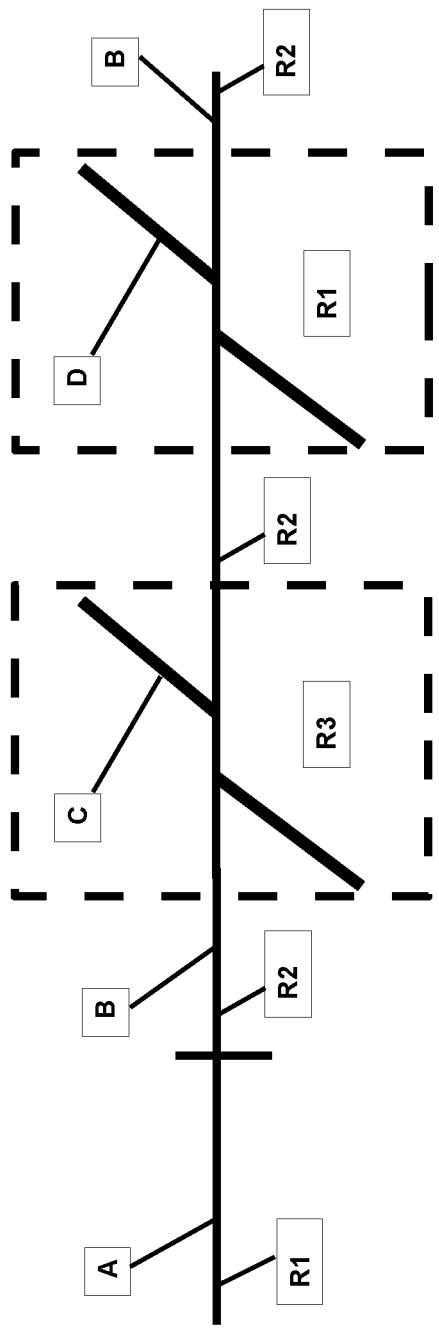
FIG. 6B are diagrams of exemplary ancillary subdivision/districts of an implementation of one or more processes as disclosed herein.

Referring now to FIG. 6B, in some non-limiting embodiments or aspects as shown in FIG. 6B, when a railroad operating an ancillary subdivision/district may issue a unique train ID for at least one of the bulletins issued to individual trains, crew acknowledgement of bulletins, movement authority issued from the office (e.g., pass signal at stop) to traverse the ancillary subdivision/district, and/or the like. In some examples, a unique train ID assignment by the railroad that operates an ancillary subdivision/district is not necessary, and another identifier, such as a locomotive ID may be used in place of a train ID. For example, a train ID may or may not have been established during initialization for the railroad that operates an ancillary subdivision/district. In an example, subdivision/districts A and B are in the train subdivision/district list, and railroads (R1 and R2) that are operating subdivision/districts A and B, respectively, are selected at initialization, and a train ID has been established for both of those railroads. In another example, subdivision/districts C and D are ancillary subdivision/districts. The railroad (R3) including subdivision/district C was not selected as an operating railroad at initialization so no train ID has been established for subdivision/district C. In addition, Subdivision/district D is not included in the subdivision/district list from the railroad (R1). In such an example, railroad (R1) is selected as an operating railroad at initialization and a train ID is established. Since railroad (R1) operates both subdivision/district A and subdivision/district D, an ancillary subdivision/district D operated by railroad (R1) is shown for which a train ID has been established, because railroad (R1) also operates a subdivision/district (A) in the train subdivision/district list.

In some non-limiting embodiments or aspects, when a railroad that operates an ancillary subdivision/district is selected by an operator (e.g., a crew member, etc.) as an operating railroad at initialization, interactions between the back office system (e.g., remote server 120, etc.), an individual and composite cyclical redundancy check (CRC) calculator (IC3), and onboard computer 102 may utilize the train ID established for that railroad during initialization. If the railroad that operates an ancillary subdivision/district was not selected by the crew as an operating railroad at initialization, interactions between the back office system (e.g., remote server 120, etc.), the IC3, and onboard computer 102 may utilize the train ID obtained and assigned via a message exchange.

In some non-limiting embodiments or aspects, an onboard computer 102 may maintain an ancillary subdivision/district list for each railroad that operates a subdivision/district ancillary to a subdivision/district in the train subdivision/district list as it goes through the process of obtaining track data. This list of subdivision/districts may identify an ancillary subdivision/district operated by each railroad and the subdivision/district(s) on the train subdivision/district list to which they are ancillary.

In some non-limiting embodiments or aspects, an ancillary subdivision/district list assists the back office in determining which mandatory directives should be associated with the train ID. In another example, a remote server 120 may use the links between the ancillary subdivision/district and the train subdivision/district list to identify the specific sections of track to be traversed by the train 10 in order to filter the mandatory directives associated with the train 10 or determine which crew acknowledgement of bulletin request messages to send to the onboard computer 102.

Figure 7:
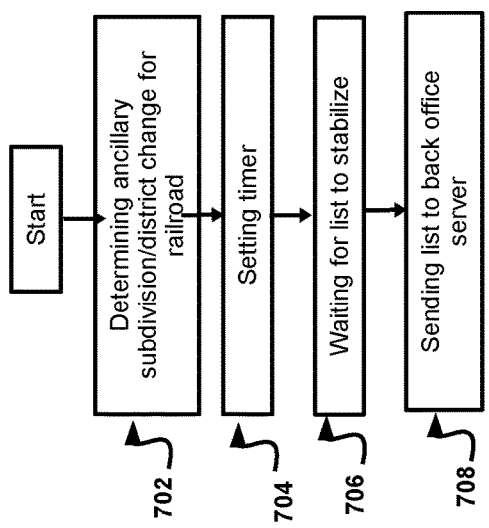
FIG. 7 is a flowchart of a non-limiting embodiment or aspect of a process for obtaining track data for interlocked subdivisions.

Referring now to FIG. 7, FIG. 7 is a flowchart of a non-limiting embodiment or aspect of a process 700 for obtaining track data based on an ancillary subdivision/district list change. In some non-limiting embodiments or aspects, one or more of the steps of process 700 are performed (e.g., completely, partially, etc.) by onboard computer 102, navigation system 104, and/or remote server 106. In some non-limiting embodiments or aspects, one or more of the steps of process 700 are performed (e.g., completely, partially, etc.) by another device or a group of devices separate from or including onboard computer 102 (e.g., one or more processors of onboard computer 102, one or more processors of communication device 102a, one or more processors of visual display device 102b, one or more processors of train database 102c, etc.), remote server 106 (e.g., one or more processors of remote server 106, one or more processors of communication device 106a, one or more processors of visual display device 106b, one or more processors of central database 106c, etc.), the navigation system 104 (e.g., one or more processors of navigation system 104, one or more processors of positioning system 104a, one or more speed sensors 104b, one or more inertial sensors 104c, etc.), remote server 120 (e.g., one or more processors of remote server 120, one or more processors of communication device 120a, one or more processors of visual display device 120b, one or more processors of central database 120c, etc.) and/or wayside interface unit 218a, 218b (e.g., one or more processors of wayside interface unit 218a, 218b, one or more processors of wayside devices 216a-d, 216e-h, etc.).

As shown in FIG. 7, at step 702, process 700 includes determining an ancillary subdivision/district change for a railroad. For example, in some non-limiting embodiments or aspects, the onboard computer 102 updates a railroad's ancillary subdivision/districts. In an example, exchanging a train ID and ancillary subdivision/district list information is initiated when a railroad's ancillary subdivision/district list changes onboard. For example, a new message pair may be added to the vehicle control system to allow the back office of a railroad that operates an ancillary subdivision/district to assign a train ID if no train ID was established during onboard initialization, and communicate the list of ancillary subdivision/districts operated by that railroad to the back office.

In some non-limiting embodiments or aspects, if enabled for the railroad that operates an ancillary subdivision/district, onboard computer 102 directs an ancillary subdivision/district list and train ID request message to the crew interaction back office system. In another example, if disabled, onboard computer 102 directs the ancillary subdivision/district list and train ID message. The process of exchanging a train ID and ancillary subdivision/district list information starts when a railroad's ancillary subdivision/district list changes onboard.

In some non-limiting embodiments or aspects, frequent changes to the ancillary subdivision/district list are made as the onboard computer 102 accepts train subdivision/district list messages and loads track data for subdivision/districts on the train subdivision/district list toward the end of initialization.

As shown in FIG. 7, at step 704, process 700 includes setting a timer. For example, in some non-limiting embodiments or aspects, the onboard computer 102 sets a timer. For example, the onboard computer 102 may set a configurable timer. As an example, to avoid flooding back office systems (e.g., remote server 120, etc.) with multiple ancillary subdivision/district lists and train ID messages the onboard computer 102 may set a configurable timer whenever the ancillary subdivision/district list changes for a railroad.

As shown in FIG. 7, at step 706, process 700 includes waiting for the train subdivision/district list to stabilize. For example, in some non-limiting embodiments or aspects, the onboard computer 102 waits for train subdivision/district list changes to stabilize. As an example, onboard computer 102 determines a configurable period has elapsed with no further changes to the list.

As shown in FIG. 7, at step 708, process 700 includes sending the subdivision/district list to back office server. For example, in some non-limiting embodiments or aspects, the onboard computer 102 sends the ancillary subdivision/district list and train ID to back office system (e.g., remote server 120). As an example, onboard computer 102 sends the ancillary subdivision/district list and train ID message to a back office system. For example, if the railroad is an operating railroad selected for initialization the onboard computer 102 may populate the ancillary subdivision/district list and train ID message by using the train ID established for that railroad during initialization, including a railroad standard carrier alpha code ("SCAC") (e.g., a railroad SCAC of a railroad that operates the ancillary subdivision/district, etc.), an interface version (e.g., identifies a specific collection of message versions, etc.), a train ID description (e.g., a train ID assigned by the railroad SCAC in this message as an operating railroad selected for initialization, a train ID assigned by the railroad SCAC in this message as an operating railroad of an ancillary subdivision/district, no train ID assigned by the railroad SCAC in this message, etc.), train ID, train ID length (e.g., a numeric value, etc.), and a number of ancillary subdivision/districts. In addition, for any ancillary subdivision/district included, a portion of the ancillary subdivision/district list and train ID message may include an ancillary subdivision/district ID, a number of adjoining subdivisions/districts (e.g., a subdivision identifier in a vehicle control system for an ancillary subdivision/district, etc.). In some non-limiting embodiments or aspects, for any adjoining subdivision, an ancillary subdivision/district list and train ID message may include an adjoining railroad SCAC (e.g., a railroad SCAC of the railroad that operates the subdivision on the train subdivision/district list, etc.) and an adjoining subdivision ID.

In some non-limiting embodiments or aspects, if a railroad is not an operating railroad selected for initialization and the onboard computer 102 has not accepted an ancillary train ID message from that railroad since initialization it may indicate that no train ID has been established in the ancillary subdivision/district list and train ID message. In a further example, if a railroad is not an operating railroad selected for initialization and the onboard computer 102 has accepted an ancillary train ID message from that railroad since initialization, it may populate the ancillary subdivision/district list and train ID message by using the train ID provided in the previous ancillary train ID message.

Figure 8:
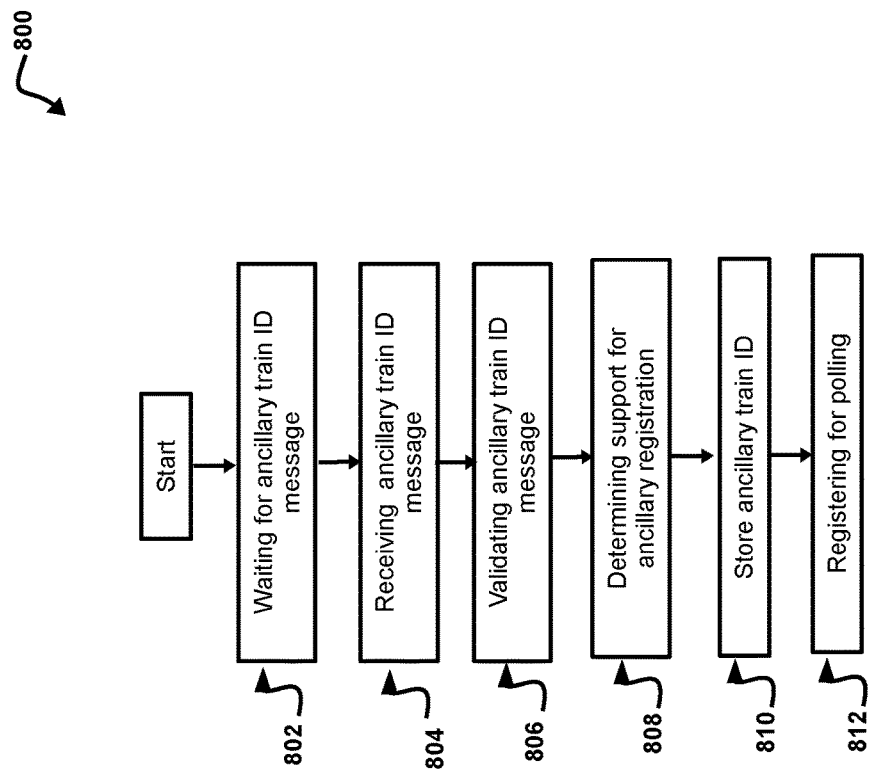
FIG. 8 is a flowchart of a non-limiting embodiment or aspect of a process for obtaining track data for interlocked subdivisions.

Referring now to FIG. 8, FIG. 8 is a flowchart of a non-limiting embodiment or aspect of a process 800 for responding to an ancillary subdivision/district list change. In some non-limiting embodiments or aspects, one or more of the steps of process 800 are performed (e.g., completely, partially, etc.) by onboard computer 102, navigation system 104, and/or remote server 106. In some non-limiting embodiments or aspects, one or more of the steps of process 800 are performed (e.g., completely, partially, etc.) by another device or a group of devices separate from or including onboard computer 102 (e.g., one or more processors of onboard computer 102, one or more processors of communication device 102a, one or more processors of visual display device 102b, one or more processors of train database 102c, etc.), remote server 106 (e.g., one or more processors of remote server 106, one or more processors of communication device 106a, one or more processors of visual display device 106b, one or more processors of central database 106c, etc.), the navigation system 104 (e.g., one or more processors of navigation system 104, one or more processors of positioning system 104a, one or more speed sensors 104b, one or more inertial sensors 104c, etc.), remote server 120 (e.g., one or more processors of remote server 120, one or more processors of communication device 120a, one or more processors of visual display device 120b, one or more processors of central database 120c, etc.) and/or wayside interface unit 218a, 218b (e.g., one or more processors of wayside interface unit 218a, 218b, one or more processors of wayside devices 216a-d, 216e-h, etc.).

As shown in FIG. 8, at step 802, process 800 includes waiting for an ancillary train ID message. For example, in some non-limiting embodiments or aspects, the onboard computer 102 waits for a response to an ancillary train ID message. As an example, several events may occur while the onboard computer 102 is waiting for a response to an ancillary subdivision/district list and train ID message (e.g., time elapses, onboard computer 102 fails, onboard computer 102 re-initializes, etc.), in response, for example, onboard computer 102 may resend a message and wait for a response.

As shown in FIG. 8, at step 804, process 800 includes receiving an ancillary train ID message. For example, in some non-limiting embodiments or aspects, the onboard computer 102 receives an ancillary train ID message including a railroad standard carrier alpha code ("SCAC") (e.g., a railroad SCAC of a railroad that operates the ancillary subdivision/district, etc.), a reason for sending, a train ID, and a train ID length (e.g., a length of a train ID field, etc.).

As shown in FIG. 8, at step 806, process 800 includes validating the ancillary train ID message. For example, in some non-limiting embodiments or aspects, the onboard computer 102 validates the ancillary train ID message. Onboard computer 102 may validate the message when it is received, such as, by performing checks including at least one of determining that the railroad standard carrier alpha code matches that in the ancillary subdivision/district list and train ID message, or performing any other validation checks of a back office system message in accordance with the vehicle control system requirements.

In some non-limiting embodiments or aspects, if the ancillary train ID message is invalid, the onboard computer 102 may discard it and continue to wait for a valid ancillary train ID message.

As shown in FIG. 8, at step 808, process 800 includes determining support for ancillary registration. For example, in some non-limiting embodiments or aspects, the onboard computer 102 determines if polling registration for ancillary subdivision/districts is available. As an example, a configuration parameter set in a back office system (e.g., remote server 120, etc.) may indicate whether a railroad supports poll registration for ancillary subdivision/districts.

In some non-limiting embodiments or aspects, the onboard computer 102 determines a railroad dispatcher system (e.g., computer aided dispatcher, etc.) supports ancillary train registration. For example, if the railroad supports poll registration for ancillary subdivision/districts, onboard computer 102 may also determine, based on a configuration parameter set in a back office system (e.g., remote server 120, etc.), if a dispatcher (e.g., a dispatch computer, a remote server, etc.) for a railroad supports ancillary train ID assignment. As an example, onboard computer 102 may request a train ID from a dispatcher upon receipt of the ancillary subdivision/district list and train ID message from a locomotive that has not already been assigned a train ID.

In some non-limiting embodiments or aspects, onboard computer 102 may determine the ancillary train ID message is valid and indicates that the back office system (e.g., remote server 120, etc.) does not support registration for ancillary subdivision/districts, the onboard computer 102 may stop sending ancillary subdivision/district list and train ID messages for that railroad and may not attempt to register for polling for any of the ancillary subdivision/districts operated by that railroad.

As shown in FIG. 8, at step 810, process 800 includes storing an ancillary train ID. For example, in some non-limiting embodiments or aspects, the onboard computer 102 stores an ancillary train ID. In some non-limiting embodiments or aspects, process 800 includes determining if a train ID is a non-zero length train ID. In some non-limiting embodiments or aspects, process 800 includes determining if a train ID is already established in an onboard computer. For example, if the train ID is not established, onboard computer 102 may store a train ID changed from a previous train ID. As an example, onboard computer 102 may store the train ID from the ancillary train ID message and begin registering for polls for the ancillary subdivision/district(s) using that train ID.

As shown in FIG. 8, at step 812, process 800 includes registering for polling. For example, in some non-limiting embodiments or aspects, the onboard computer 102 sends a poll registration message to a back office system (e.g., remote server 120) that controls an ancillary subdivision/district. For example the onboard computer 102 registers for polling in a back office system (e.g., remote server 120, etc.) as described below with regard to FIG. 9.

Figure 9:
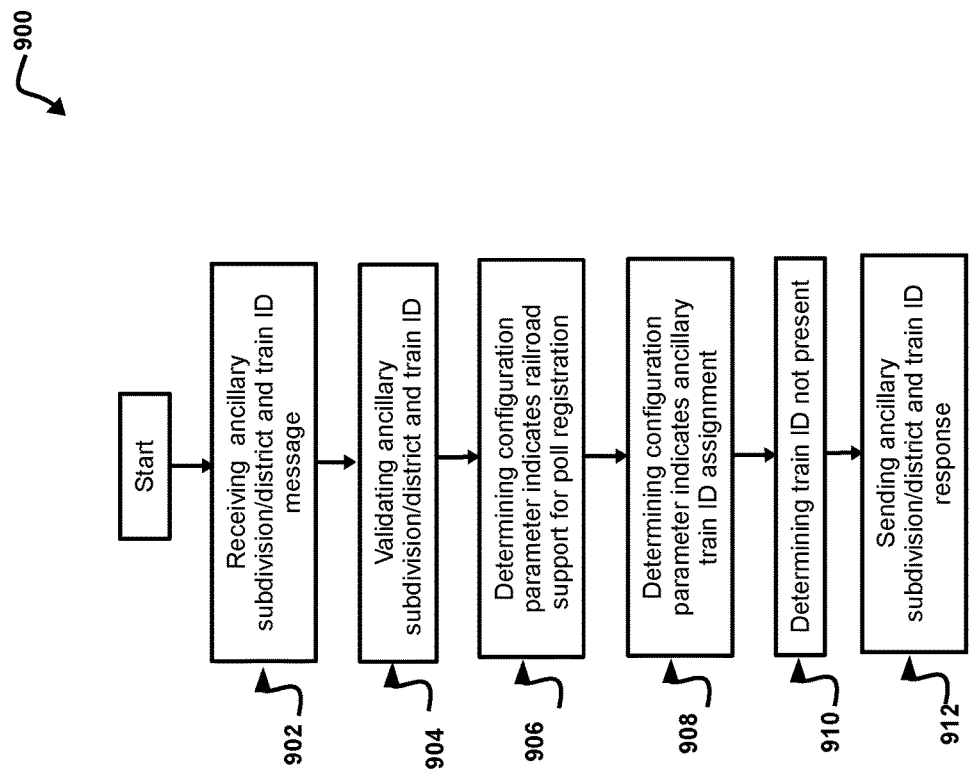
FIG. 9 is a flowchart of a non-limiting embodiment or aspect of a process for obtaining track data for interlocked subdivisions.

Referring now to FIG. 9, FIG. 9 is a flowchart of a non-limiting embodiment or aspect of a process 900 for responding to an ancillary subdivision/district and train ID request. In some non-limiting embodiments or aspects, one or more of the steps of process 900 are performed (e.g., completely, partially, etc.) by onboard computer 102, navigation system 104, and/or remote server 106. In some non-limiting embodiments or aspects, one or more of the steps of process 900 are performed (e.g., completely, partially, etc.) by another device or a group of devices separate from or including onboard computer 102 (e.g., one or more processors of onboard computer 102, one or more processors of communication device 102a, one or more processors of visual display device 102b, one or more processors of train database 102c, etc.), remote server 106 (e.g., one or more processors of remote server 106, one or more processors of communication device 106a, one or more processors of visual display device 106b, one or more processors of central database 106c, etc.), the navigation system 104 (e.g., one or more processors of navigation system 104, one or more processors of positioning system 104a, one or more speed sensors 104b, one or more inertial sensors 104c, etc.), remote server 120 (e.g., one or more processors of remote server 120, one or more processors of communication device 120a, one or more processors of visual display device 120b, one or more processors of central database 120c, etc.) and/or wayside interface unit 218a, 218b (e.g., one or more processors of wayside interface unit 218a, 218b, one or more processors of wayside devices 216a-d, 216e-h, etc.).

As shown in FIG. 9, at step 902, process 900 includes receiving an ancillary subdivision/district and train ID message. For example, in some non-limiting embodiments or aspects, the remote server 120 receives an ancillary subdivision/district and train ID message. In an example, remote server 120 determines a response to an ancillary subdivision/district list and train ID request.

As shown in FIG. 9, at step 904, process 900 includes validating the ancillary subdivision/district and train ID. For example, in some non-limiting embodiments or aspects, the remote server 120 validates the ancillary subdivision/district and train ID. For example, if the ancillary train ID message is valid and indicates that the back office system (e.g., remote server 120, etc.) supports registration for ancillary subdivision/districts the onboard computer 102 may evaluate the train ID returned in the message.

As shown in FIG. 9, at step 906, process 900 includes determining a configuration parameter indicates railroad support for poll registration. For example, in some non-limiting embodiments or aspects, the remote server 120 returns a configuration parameter to indicate railroad support for poll registration.

As shown in FIG. 9, at step 908, process 900 includes determining a configuration parameter indicates ancillary train ID assignment. For example, in some non-limiting embodiments or aspects, remote server 120 returns a configuration parameter to indicate an ancillary train ID assignment. For example, remote server 120 sets a configuration parameter if a dispatcher (e.g., a dispatch computer, a remote server, etc.) for a railroad supports ancillary train ID assignment.

As shown in FIG. 9, at step 910, process 900 includes determining a train ID is not present. For example, in some non-limiting embodiments or aspects, remote server 120 may request a train ID from a dispatcher upon receipt of the ancillary subdivision/district list and train ID message from a locomotive that has not already been assigned a train ID (e.g., send a request upon receipt of an ancillary subdivision/district list and train ID message from a locomotive that has not already been assigned a train ID, etc.). In another example, a remote server 120 may not support ancillary train ID assignment and may generate a train ID according to the railroad's train ID format specifications.

In some non-limiting embodiments or aspects, remote server 120 may return a zero length train ID in the ancillary train ID message, to indicate onboard computer 102 may stop sending ancillary subdivision/district list and train ID messages for that railroad and may not attempt to register for polling for any of the ancillary subdivision/districts operated by that railroad. In another example, remote server 120 may return a non-zero length train ID in the ancillary train ID message to indicate onboard computer 102 does not have a train ID for the railroad operating the ancillary subdivision/district either via initialization or from a previous ancillary train ID message. In a further example, if a railroad is an operating railroad selected for initialization and remote server 120 returns an ancillary train ID message having a same train ID sent in an ancillary subdivision/district list and train ID message (e.g., a train ID established during initialization, etc.), an onboard computer 102 may begin registering for polls for the ancillary subdivision(s)/district(s) using that train ID. In a further example, onboard computer 102 may support only one train ID per railroad, if the railroad is an operating railroad selected for initialization and the ancillary train ID message includes a different train ID from the one sent in the ancillary subdivision/district list and train ID message, the onboard computer 102 may not attempt to register for polling for any of the ancillary subdivision/districts operated by that railroad.

In some non-limiting embodiments or aspects, if a railroad is not an operating railroad selected for initialization and remote server 120 returns an ancillary train ID message having a different non-zero train ID than the one sent in the ancillary subdivision/district list and train ID message, an onboard computer 102 may discard a previously stored train ID and re-register for polling for the ancillary subdivision(s)/district(s) with the new train ID.

As shown in FIG. 9, at step 912, process 900 includes sending an ancillary subdivision/district and a train ID response. For example, in some non-limiting embodiments or aspects, the back office system sends an ancillary subdivision/district and a train ID response.

Figure 10:
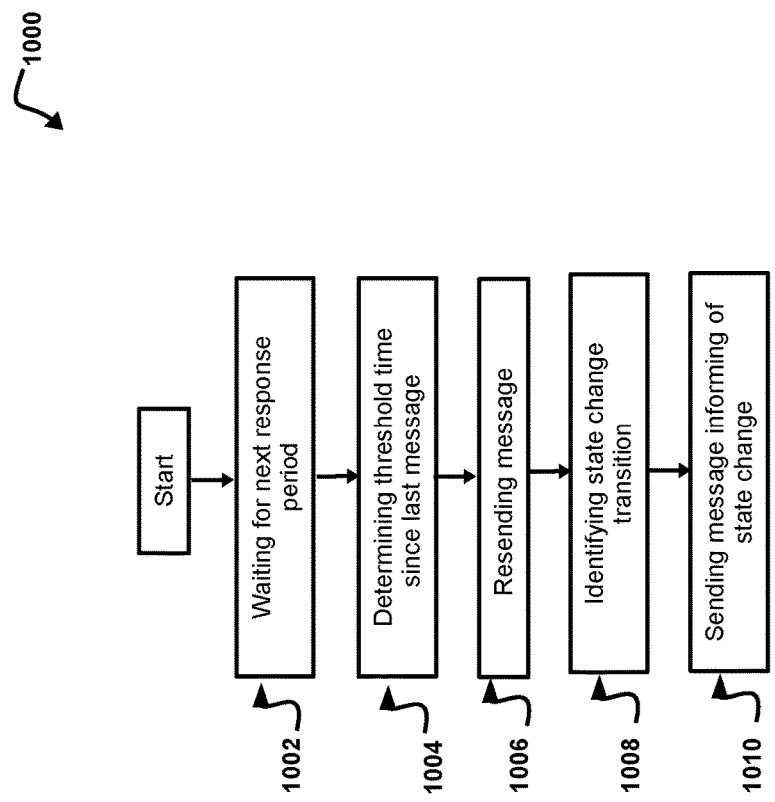
FIG. 10 is a flowchart of a non-limiting embodiment or aspect of a process for obtaining track data for interlocked subdivisions.

Referring now to FIG. 10, FIG. 10 is a flowchart of a non-limiting embodiment or aspect of a process 1000 for periodically synchronizing ancillary subdivision/district information. In some non-limiting embodiments or aspects, one or more of the steps of process 1000 are performed (e.g., completely, partially, etc.) by onboard computer 102, navigation system 104, and/or remote server 106. In some non-limiting embodiments or aspects, one or more of the steps of process 1000 are performed (e.g., completely, partially, etc.) by another device or a group of devices separate from or including onboard computer 102 (e.g., one or more processors of onboard computer 102, one or more processors of communication device 102a, one or more processors of visual display device 102b, one or more processors of train database 102c, etc.), remote server 106 (e.g., one or more processors of remote server 106, one or more processors of communication device 106a, one or more processors of visual display device 106b, one or more processors of central database 106c, etc.), the navigation system 104 (e.g., one or more processors of navigation system 104, one or more processors of positioning system 104a, one or more speed sensors 104b, one or more inertial sensors 104c, etc.), remote server 120 (e.g., one or more processors of remote server 120, one or more processors of communication device 120a, one or more processors of visual display device 120b, one or more processors of central database 120c, etc.) and/or wayside interface unit 218a, 218b (e.g., one or more processors of wayside interface unit 218a, 218b, one or more processors of wayside devices 216a-d, 216e-h, etc.).

As shown in FIG. 10, at step 1002, process 1000 includes waiting for a next response period. For example, in some non-limiting embodiments or aspects, the onboard computer 102 waits for the next response period.

As shown in FIG. 10, at step 1004, process 1000 includes determining a threshold time since last message. For example, in some non-limiting embodiments or aspects, the onboard computer 102 determines a threshold time since the last message. For example, onboard computer 102 determines a predetermined number of seconds have elapsed since sending an ancillary subdivision/district list and train ID message and it has not received a valid ancillary train ID message in response.

As shown in FIG. 10, at step 1006, process 1000 includes resending a message. For example, in some non-limiting embodiments or aspects, the onboard computer 102 resends a message. As an example, onboard computer 102 resends an ancillary subdivision/district list and train ID message. The onboard computer 102 may send the ancillary subdivision/district list and train ID message up to a configurable number of times (e.g., 3, 10, etc.). In addition to sending the ancillary subdivision/district list and train ID message upon a change in the ancillary subdivision/district list, while the onboard computer 102 is in a controlling state (active, disengaged, or restricted), it may send the ancillary subdivision/district list and train ID message periodically at a configurable rate. This allows the back office system to synchronize its ancillary subdivision/district information with the onboard computer 102.

As shown in FIG. 10, at step 1008, process 1000 includes identifying a state change transition. For example, in some non-limiting embodiments or aspects, the onboard computer 102 identifies a state change transition. For example, an absence of an ancillary train ID message from remote server 120 may indicate to an onboard computer 102 that a failure of the communication segment to deliver messages has occurred. In addition, an absence of an ancillary train ID message from remote server 120 may indicate to an onboard computer 102 that a back office system (e.g., remote server 120, etc.) may not recognize the ancillary subdivision/district list and train ID messages it is receiving from the onboard computer 102 because it has not been updated to support poll registration for ancillary subdivisions/districts. In such an example, onboard computer 102 may not distinguish between a failure and a recognition failure, and may continue to retry the ancillary subdivision/district list and train ID message as described above. When the onboard computer 102 transitions to a non-controlling state (cut out, failed, or initializing) the onboard computer 102 may stop sending ancillary subdivision/district list and train ID messages. The onboard computer 102 may inform the back office of its state change with a locomotive system state message.

As shown in FIG. 10, at step 1010, process 1000 includes sending a message informing of a state change. For example, in some non-limiting embodiments or aspects, the onboard computer 102 sends a message informing of a state change.

In some non-limiting embodiments or aspects, onboard computer 102 may send a poll registration message to the back office system (e.g., remote server 120, etc.) that controls an ancillary subdivision/district when it has loaded the track data file for that ancillary subdivision/district and it has accepted an ancillary train ID message with a 'reason for sending' indicating that registration for ancillary subdivision/districts is supported and a valid train ID for the railroad that operates that subdivision/district. For example, a 'reason for sending' field may be added to a poll registration message to indicate to the back office system (e.g., remote server 120, etc.) whether a registration is for a subdivision/district in the train subdivision/district list, an ancillary subdivision/district operated by a railroad which is also an operating railroad selected for initialization, an ancillary subdivision/district operated by a railroad which was not selected as an operating railroad for initialization, and/or the like.

In some non-limiting embodiments or aspects, onboard computer 102 may determine a polling rate using a distance between a GPS location and a closest point in the ancillary subdivision/district, just as it does for subdivisions/districts in the train subdivision/district list.

In some non-limiting embodiments or aspects, a new enumeration may be added to a 'reason for sending' field in a confirmation of poll registration message to indicate that a back office system (e.g., remote server 120, etc.) does not support poll registration for ancillary subdivisions/districts. As an example, a railroad may use an enumeration prior to their back office systems being updated to support ancillary subdivision/district polling. The back office system (e.g., remote server 120, etc.) may respond with a confirmation of poll registration message. For example, if the message indicates that a back office system (e.g., remote server 120, etc.) does not support ancillary subdivision/district polling, an onboard computer 102 may stop attempts to register for polling for the ancillary subdivision/district.

In some non-limiting embodiments or aspects, if a back office system (e.g., remote server 120, etc.) positively acknowledges a poll registration, it may begin sending office segment poll messages at the requested poll rate. An office segment poll message may combine information for ancillary subdivision/districts and subdivisions/districts in a train subdivision/district list controlled by the same back office system (e.g., remote server 120, etc.).

In some non-limiting embodiments or aspects, a train subdivision/district list cyclical redundancy check ("CRC") is used in a railroad having a back office system (e.g., remote server 120, etc.) that is sending an office segment poll message that was not selected as an operating railroad during initialization. For example, back office system (e.g., remote server 120, etc.) may populate the train subdivision/district list CRC field with zeroes. The ancillary subdivision/district list provided by the onboard computer 102 in the ancillary subdivision/district list and train ID message need not be propagated by dispatcher to affected back office system (e.g., remote server 120, etc.) instances. As an example, a back office system (e.g., remote server 120, etc.) restricts polling to only trains that have a valid train subdivision/district list. The back office system (e.g., remote server 120, etc.) may need to be updated to allow polling for ancillary subdivision/districts.

In some non-limiting embodiments or aspects, a configuration version list CRC is used in a back office system (e.g., remote server 120, etc.) to populate a field according to a specific server configuration associated with a locomotive ID.

In some non-limiting embodiments or aspects, a dataset CRC is used to populate according to mandatory directives (bulletins and movement authorities) for the subdivision associated with the train ID established.

In some non-limiting embodiments or aspects, a composite CRC (e.g., ICR3, etc.) may populate the field according to the information provided by individual and composite CRC calculator ("IC3") for the subdivision/district associated with the train ID established.

In some non-limiting embodiments or aspects, onboard computer 102 may deregister for polls for an ancillary subdivision/district if onboard computer 102 transitions out of a controlling state (e.g., active, disengaged, restricted, etc.) or an ancillary subdivision/district is removed from the onboard computer 102's ancillary subdivision/district list.

In some non-limiting embodiments or aspects, when the onboard computer 102 receives a configuration version list CRC in an office segment poll message from a railroad that operates an ancillary subdivision/district, but was not selected as an operating railroad during initialization, it may request the configuration version list from the back office system (e.g., remote server 120, etc.) that sent the message. If the software and common configuration fileset versions loaded on the onboard computer 102 are preferred or acceptable for that railroad, the onboard computer 102 may validate that it has a compatible preferred or acceptable railroad specific configuration fileset for the railroad.

In some non-limiting embodiments or aspects, onboard computer 102 may mark the ancillary subdivision/district controlled by that railroad as 'non-synchronized' to indicate the software or a common configuration fileset version loaded onto onboard computer 102 is not preferred (e.g., acceptable, etc.) for the railroad, that there is no preferred railroad specific configuration fileset compatible with the currently loaded software, and/or the like. In this way, the onboard computer 102 can operate over a majority of its planned routes in an active state while degrading to the disengaged state for exceptions where a railroad does not comply with a versioning convention.

In some non-limiting embodiments or aspects, onboard computer 102 may use the railroad specific configuration parameter settings of the railroad operating an ancillary subdivision/district for targets on the track in that subdivision.

In some non-limiting embodiments or aspects, an onboard computer 102 may synchronize datasets for an ancillary subdivision/district with the back office system (e.g., remote server 120, etc.). The onboard computer 102 may request the current dataset list and request the mandatory directives it needs for the ancillary subdivision/district.

In some non-limiting embodiments or aspects, a back office system (e.g., remote server 120, etc.) may not send a request to a dispatcher for the subdivision/district list for a specific train 10 when the onboard computer 102 registers for polling for an ancillary subdivision/district as indicated in the 'reason for sending' field being added to the poll registration message. In such an example, back office system (e.g., remote server 120, etc.) may deliver to the onboard computer 102 only those bulletins for that subdivision/district that do not explicitly identify trains, or are addressed to the train ID assigned by the dispatcher.

In some non-limiting embodiments or aspects, if the railroad operating the ancillary subdivision/district issues movement authority to trains, the dispatching system must grant movement authority to the train ID that was assigned by dispatcher. No movement authority can be granted to a train ID generated by the back office system (e.g., remote server 120, etc.). If the railroad operating the ancillary subdivision/district issues movement authority to a locomotive.

In some non-limiting embodiments or aspects, it is possible for a mandatory directive to span an ancillary subdivision/district and a subdivision/district in the train subdivision/district list if both subdivisions/districts are operated by the same railroad. The back office system (e.g., remote server 120, etc.), IC3, and onboard computer 102 may handle this type of spanning mandatory directive in the same manner as they handle mandatory directives that span subdivisions/districts in the train subdivision/district list.

In some non-limiting embodiments or aspects, back office system (e.g., remote server 120, etc.) and IC3 may interact as currently designed, using the train ID used to register for polling in the poll registration message. The onboard computer 102 may validate the IC3 uniqueness index, composite CRC, and individual dataset CRCs as currently designed.

In some non-limiting embodiments or aspects, onboard computer 102 may display the text of any mandatory directive accepted for an ancillary subdivision/district in the same manner as it does for subdivisions/districts in the train subdivision/district list. Bulletin order may be conveyed for an ancillary subdivision/district with a bulletin sequence message in the same manner as for subdivisions/districts in the train subdivision/district list.

In some non-limiting embodiments or aspects, onboard computer 102 may prompt the crew to acknowledge bulletins for ancillary subdivision/district based on the information received in the crew acknowledgement of bulletin request message in the same manner as it does for bulletins in the subdivisions/districts in the train subdivision/district list. If crew acknowledgement of a bulletin is required, the dispatching system may need to address the request to the train ID that was established.

In some non-limiting embodiments or aspects, synchronizing the mandatory directives for ancillary subdivision/districts, in addition to the subdivisions/districts in the train subdivision/district list, may include additional storage capabilities by the onboard computer 102. As an example, onboard computer 102 may negatively acknowledge and discard any mandatory directive dataset which it cannot store and set the subdivisions/districts spanned by that mandatory directive to non-synchronized.

In some non-limiting embodiments or aspects, an ancillary subdivision/district list and train ID message allows the onboard computer 102 to provide a list of adjoining subdivisions/districts to an ancillary subdivision/district. The railroad operating the ancillary subdivision/district may use this list to bound the list of bulletins addressed to a train. The back office system (e.g., remote server 120, etc.) may filter the delivery of bulletins addressed to all trains, for example, based on track geometry or polling type.

In some non-limiting embodiments or aspects, onboard computer 102 may report authority violations when the point of violation is on an ancillary subdivision/district to the back office system (e.g., remote server 120, etc.) that controls that ancillary subdivision/district and back office system (e.g., remote server 120, etc.) may forward authority violation messages to all locomotives that are registered for polls for that subdivision.

In an example where train A has violated its authority on an ancillary subdivision/district. That violation is reported to train B which has registered for polls on that subdivision/district because it is on train B's subdivision/district list. Train C also receives the violation report because it has registered for polls on that subdivision/district as an ancillary subdivision/district. As an example, a train may not be notified of any authority violation with a point of violation on the subdivision/district since it has not registered for polling on that subdivision/district.

Figure 11:
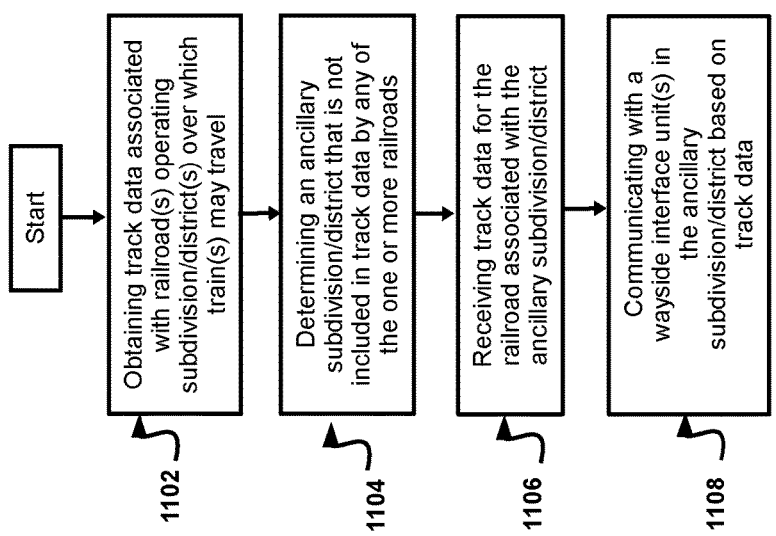
FIG. 11 is a flowchart of a non-limiting embodiment or aspect of a process for obtaining track data for interlocked subdivisions.

Referring now to FIG. 11, FIG. 11 is a flowchart of a non-limiting embodiment or aspect of a process 1100 for responding to an ancillary subdivision/district and train ID request. In some non-limiting embodiments or aspects, one or more of the steps of process 1100 are performed (e.g., completely, partially, etc.) by onboard computer 102, navigation system 104, and/or remote server 106. In some non-limiting embodiments or aspects, one or more of the steps of process 1100 are performed (e.g., completely, partially, etc.) by another device or a group of devices separate from or including onboard computer 102 (e.g., one or more processors of onboard computer 102, one or more processors of communication device 102a, one or more processors of visual display device 102b, one or more processors of train database 102c, etc.), remote server 106 (e.g., one or more processors of remote server 106, one or more processors of communication device 106a, one or more processors of visual display device 106b, one or more processors of central database 106c, etc.), the navigation system 104 (e.g., one or more processors of navigation system 104, one or more processors of positioning system 104a, one or more speed sensors 104b, one or more inertial sensors 104c, etc.), remote server 120 (e.g., one or more processors of remote server 120, one or more processors of communication device 120a, one or more processors of visual display device 120b, one or more processors of central database 120c, etc.) and/or wayside interface unit 218a, 218b (e.g., one or more processors of wayside interface unit 218a, 218b, one or more processors of wayside devices 216a-d, 216e-h, etc.).

As shown in FIG. 11, at step 1102, process 1100 includes obtaining track data associated with railroads operating subdivision(s)/district(s) over which trains may travel. For example, in some non-limiting embodiments or aspects, onboard computer 102 obtains track data associated with one or more railroads operating one or more subdivisions/districts over which a train may travel.

In some non-limiting embodiments or aspects, onboard computer 102 initializes the onboard computer 102 by providing information including employee credentials and the one or more railroads over which the train is expected to travel. In addition, onboard computer 102 may receive, from a remote server 120 (e.g., a back office server, etc.), at least one of a list of subdivisions/districts the train is expected to operate over.

As shown in FIG. 11, at step 1104, process 1100 includes determining an ancillary subdivision/district that is not included in track data by any of the one or more railroads. For example, in some non-limiting embodiments or aspects, onboard computer 102 determines an ancillary subdivision/district that is not included in track data by any of the one or more railroads.

In some non-limiting embodiments or aspects, process 1100 includes determining at least one subdivision/district having at least one track segment intersecting the one or more subdivisions/districts, wherein the at least one subdivision/district is not operated by the one or more railroads operating the one or more subdivisions/districts, and further wherein the at least one subdivision/district comprises: the at least one track segment of the at least one subdivisions/districts, or one or more wayside systems (e.g., wayside interface units, wayside devices, etc.) of the at least one subdivision/district operating within the at least one track segment. For example, onboard computer 102 determines at least one subdivision/district having at least one track segment intersecting the one or more subdivisions/districts. In some non-limiting embodiments or aspects, the at least one subdivision/district may not be operated by the one or more railroads operating the one or more subdivisions/districts. In some non-limiting embodiments or aspects, the at least one subdivision/district comprises at least one track segment of the at least one subdivision/district, or one or more wayside systems of the at least one subdivision/district operating within the at least one track segment.

In some non-limiting embodiments or aspects, onboard computer 102 may register for polling the ancillary subdivision/district with the railroad operating the ancillary subdivision/district with which the onboard computer has initialized after obtaining track data for the ancillary subdivision/district. In some non-limiting embodiments or aspects, an ancillary subdivision/district may not be obtained and/or may not be included in track data by any of the one or more railroads with which the onboard computer 102 has initialized. For example, a railroad of the one or more railroads associated with an ancillary subdivision/district determines a train ID of the train 10 is not in one or more train identifiers of the railroad associated with one or more respective trains 10, and the railroad generates and sends a train ID associated with the train 10, and the train 10 registers a polling request for the ancillary subdivision/district based on the train ID. As an example, when the ancillary subdivision/district is not included in a train subdivision/district list by any of the railroads, the onboard computer 102 obtains and uses a train ID assigned to it by a remote server 120 of a railroad operating the ancillary subdivision/district to register with the railroad associated with the ancillary subdivision/district during initialization. However, in such an example, the onboard computer 102 may not register for polling with a railroad operating an ancillary subdivision/district that is not in the one or more railroads until it has obtained a train ID from that railroad. In some non-limiting embodiments or aspects, onboard computer 102 sends a request for a train ID and/or an ancillary subdivision/district to a railroad operating an ancillary subdivision/district.

In some non-limiting embodiments or aspects, onboard computer 102 registers a polling request for a back office system of the railroad associated with the ancillary subdivision/district, the polling request including a train ID. In such an example, onboard computer 102 may receive a confirmation of poll registration from the back office system, and may receive poll messages including a hash over a list of mandatory directive identifiers and a track data version. In a further example, onboard computer 102 may validate the track data. For example, onboard computer 102 may check that a track data version is based on a matching request. In some non-limiting embodiments or aspects, the train ID includes at least one of a locomotive ID, a train ID established during initialization, or a train ID assigned by the back office system responding to the polling request. For example, one or more poll messages may include a hash over a dataset pertinent to the subdivision including one or more of an identifier and CRC of 0 or more authorities, an identifier and CRC of 0 or more bulletins, a version and CRC of current track data file. In an example, the on-board computer needs to make a subsequent request ("Request Current Dataset") in order to obtain the source data for the hash.

In some non-limiting embodiments or aspects, onboard computer 102 receives poll messages periodically. In some non-limiting embodiments or aspects, the poll messages may include an identifier of at least one of a form-based authority, a bulletin, a speed restriction, or a null list of mandatory directive identifiers.

In some non-limiting embodiments or aspects, onboard computer 102 may deregister, such that, for example, polling is cancelled when the ancillary subdivision/district is removed from a list of one or more subdivisions/districts. For example, onboard computer 102 deregisters for an ancillary subdivision/district if the onboard computer 102 transitions out of a controlling state (e.g., active, disengaged, restricted, etc.), an ancillary subdivision/district is removed from the onboard computer 102 (e.g., removed from the ancillary subdivision/district list of the onboard computer 102, etc.), and/or the like. For example, deregistration may be applied to an ancillary subdivision if the intersecting subdivision that caused the ancillary subdivision to be identified is removed from the train subdivision list.

In some non-limiting embodiments or aspects, onboard computer 102 resends a polling request for track data within a threshold amount of time. For example, a threshold amount of time may be determined by onboard computer 102 and/or remote server 120 of the operating railroad of the ancillary subdivision/district.

As shown in FIG. 11, at step 1106, process 1100 includes receiving track data for the railroad associated with the ancillary subdivision/district. For example, in some non-limiting embodiments or aspects, onboard computer 102 receives track data for the railroad associated with the ancillary subdivision/district. For example, onboard computer obtains and/or is updated with a portion of the track data for at least one railroad of the one or more railroads, and the track data includes intersecting subdivision/district identifiers associated with track data of the at least one railroad having at least one track segment intersecting one or more subdivisions/districts.

In some non-limiting embodiments or aspects, onboard computer 102 receives track data for the railroad associated with the ancillary subdivision/district based on generating a request for track data for the railroad associated with the ancillary subdivision/district. In such an example, onboard computer 102 may receive a response including a track data version for the ancillary subdivision/district. Onboard computer 102 may validate the response.

In some non-limiting embodiments or aspects, onboard computer 102 may obtain track data associated with the track data version based on receiving a response including a track data version for the ancillary subdivision/district. In such an example, onboard computer 102 may update the onboard computer 102 with a portion of track data associated with the ancillary subdivision/district.

In some non-limiting embodiments or aspects, onboard computer 102 may obtain the track data associated with the track data version by determining if the track data is stored locally. In such an example, onboard computer 102 may determine the track data is not stored locally, and in response to determining the track data is not stored locally, sending a request for the track data to a back office system of the railroad associated with the ancillary subdivision/district. For example, onboard computer 102 sends a request to synchronize all filesets (software, configuration files, and track) with the back office system, not just a specific track data file. In such an example, onboard computer 102 may receive track data for the ancillary subdivision/district from the back office system of the railroad associated with the ancillary subdivision/district. Onboard computer 102 may validate the track data based on the request.

As shown in FIG. 11, at step 1108, process 1100 includes communicating with one or more wayside interface units in the ancillary subdivision/district based on track data. For example, in some non-limiting embodiments or aspects, onboard computer 102 communicates with one or more wayside interface units in the ancillary subdivision/district based on track data.

In some non-limiting embodiments or aspects, onboard computer 102 receives a local device status table to decode a device status code associated with a wayside device in the ancillary subdivision/district. The device status code may be associated with a wayside device that is monitored by a wayside interface unit. For example a wayside interface unit may monitor several wayside devices.

In some non-limiting embodiments or aspects, onboard computer 102 receives, stores, determines, and/or communicates a security key for decrypting messages of at least one of wayside device 216a-d, 216e-h, or wayside interface unit 218a. For example, onboard computer 102 receives a security key for decrypting messages to provide an enforcement of mandatory directives, train control actions, status of signals for railroads of interlocking subdivision/districts, and any messages for determining track data of an ancillary subdivision/district as described above. In some non-limiting embodiments, a security key is received in track data for decrypting data from an ancillary subdivision, such as a device table of a wayside device 216a-d (or 216e-h), a device table 230a (or 230b) of a wayside interface unit 218a (or 230b) and/or the like.

In some non-limiting embodiments or aspects, onboard computer 102 receives and/or stores, separately from the track data, a security key associated with a wayside interface unit in the ancillary subdivision/district. In an example, onboard computer 102 obtains the security key to decrypt a message received from the wayside interface unit based on a device status of a wayside device in the ancillary subdivision/district. For example, onboard computer 102 may obtain the security key that is unique to communicate with a wayside interface unit that monitors one or more wayside devices. In some non-limiting embodiments, the security key is retrieved and used for establishing a secure communication (e.g., one or more secure communications, a secure communication channel, etc.) between a plurality of pairs of actors (e.g., parties, trains, locomotives, wayside interface units, or any combination, etc.) in a railway.

This written description uses examples to disclose the invention and enable a person of ordinary skill in the relevant art to make and practice the invention, including making and using any devices or systems and performing any incorporated methods. The patentable scope of the invention is defined by the claims. Such other examples are within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application

What is claimed is:

1. A computing system comprising:
one or more processors configured to:
obtain data associated with one or more operating authorities operating one or more areas through which a vehicle may travel;
send an ancillary area version request message to a remote server to determine an ancillary area that is not included in the data;
receive additional data from a first operating authority of the one or more operating authorities that is associated with the ancillary area that is not included in the data;
communicate with one or more wayside interface units in the ancillary area that is not included in the data; and establish an unique secure communication channel with the one or more wayside interface units responsive to determining the ancillary area that is not included in the data.

2. The computing system of claim 1, wherein the one or more processors are further configured to determine the ancillary area that is not included in the data by:
   determining a first area of the one or more areas having at least one segment intersecting the one or more areas, wherein the first area is not operated by the one or more operating authorities operating the one or more areas, and further wherein the first area comprises:
   the at least one segment, or the one or more wayside interface units.

3. The computing system of claim 1, wherein the one or more processors are further configured to:
   register a polling request for a back office computer of the first operating authority associated with the ancillary area that is not included in the data, the polling request including an identifier;
   receive a confirmation of poll registration from the back office computer;
   receive poll messages including a hash over a list of mandatory directive identifiers and a data version; and
   validate the additional data based on the poll messages.

4. The computing system of claim 3, wherein the identifier comprises a vehicle identifier, a train identifier established during initialization, or a train identifier assigned by the back office computer responding to the polling request.

5. The computing system of claim 4, wherein the one or more processors are configured to periodically receive the poll messages, and wherein the poll messages comprise an identifier of at least one of a form-based authority, a bulletin, a speed restriction, or a null list of mandatory directive identifiers.

6. The computing system of claim 3, wherein the one or more processors are configured to re-send the polling request for the additional data within a threshold amount of time.

7. The computing system of claim 1, wherein the one or more processors are further configured to:
   generate a request for the additional data from the first operating authority associated with the ancillary area in response to determining the ancillary area is not included in the data;
   receive a response including a data version for the ancillary area not included in the data based on the request for the additional data;
   validate the response received;
   obtain the additional data associated with the data version in response to validating the response; and
   update a portion of the data associated with the ancillary area not included in the data.

8. A computer-implemented method, comprising:
   obtaining, by an onboard computer of a vehicle, data associated with one or more operating authorities operating one or more areas over which the vehicle may travel;
   determining, by the onboard computer, an ancillary area of that is not included in the data by the one or more operating authorities;
   receiving, by the onboard computer, additional data from a first operating authority of the one or more operating authorities that is associated with the ancillary area that is not included in the data;
   communicating with one or more wayside interface units in the ancillary area that is not included in the data; and
   establishing an unique secure communication channel with the one or more wayside interface units responsive to determining the ancillary area that is not included in the data by the one or more operating authorities.

9. The computer-implemented method of claim 8, wherein determining the ancillary area that is not included in the data further comprises:
   determining a first area of the one or more areas having at least one segment intersecting the one or more areas, wherein the first area is not operated by the one or more operating authorities operating the one or more areas, and further wherein the first area comprises:
   the at least one segment, or the one or more wayside interface units.

10. The computer-implemented method of claim 8, further comprising:
    registering a polling request for a back office computer of the first operating authority associated with the ancillary area that is not included in the data, the polling request including an identifier;
    receiving a confirmation of poll registration from the back office computer;
    receiving poll messages including a hash over a list of mandatory directive identifiers and a data version; and
    validating the additional data based on the poll messages.

11. The computer-implemented method of claim 10, wherein the identifier comprises a vehicle identifier, an identifier established during initialization, or an identifier assigned by the back office computer responding to the polling request.

12. The computer-implemented method of claim 10, wherein the poll messages are received periodically, and wherein the poll messages comprise an identifier of at least one of a form-based authority, a bulletin, a speed restriction, or a null list of mandatory directive identifiers.

13. The computer-implemented method of claim 10, further comprising: resending the polling request for the additional data within a threshold amount of time.

14. The computer-implemented method of claim 8, further comprising:
    generating, by the onboard computer, a request for the additional data from the first operating authority associated with the ancillary area in response to determining the ancillary area is not included in the data;
    receiving a response including a data version for the ancillary area not included in the data based on the request for the additional data;
    validating the response;
    obtaining, by the onboard computer, the additional data associated with the data version in response to validating the response; and
    updating the onboard computer with a portion of the data associated with the ancillary area not included in the data.

15. A computer program product comprising at least one non-transitory computer-readable medium including program instructions that, when executed by at least one processor, cause the at least one processor to:
    obtain data associated with one or more operating authorities operating one or more areas over which a vehicle may travel;
    determine an ancillary area that is not included in the data;
    receive additional data from a first operating authority of the one or more operating authorities associated with the ancillary area not included in the data;
    communicate with one or more wayside interface units in the ancillary area not included in the data;

establish an unique secure communication channel with the one or more wayside interface units responsive to determining the ancillary area that is not included in the data.

16. The computer program product of claim 15, wherein the program instructions further cause the at least one processor to determine the ancillary area not included in the data by:
   determining a first area having at least one segment intersecting the one or more areas, wherein the first area is not operated by the one or more operating authorities operating the one or more areas, and further wherein the first area comprises:
   the at least one segment of the first area, or the one or more wayside interface units of the first area operating within the at least one segment.

17. The computer program product of claim 15, wherein the instructions further cause the at least one processor to:
   register a polling request for a back office computer of the first operating authority associated with the ancillary area that is not included in the data, the polling request including an identifier;
   receive a confirmation of poll registration from the back office computer;
   receive poll messages and a data version; and
   validate the additional data based on the poll messages.

18. The computer program product of claim 17, wherein the identifier comprises a vehicle identifier, an identifier established during initialization, or an identifier assigned by the back office computer responding to the polling request.

19. The computer program product of claim 18, wherein the poll messages are received periodically, and wherein the poll messages comprise an identifier of at least one of a form-based authority, a bulletin, a speed restriction, or a null list of mandatory directive identifiers.

20. The computer program product of claim 15, wherein the program instructions further cause the at least one processor to:
   generate a request for the additional data from the first operating authority associated with the ancillary area in response to determining the ancillary area is not included in the data;
   receive a response including a data version for the ancillary area not included in the data based on the request for additional data;
   validate the response;
   obtain the additional data associated with the data version; and
   update a portion of the data associated with the ancillary area not included in the data in response to validating the response.

21. The computing system of claim 1, wherein the secure communication channel is established for communicating messages related to the ancillary area not included in the data between the one or more processors and the remote server.

* * * * *